US010321196B2

(12) United States Patent
Peterson

(10) Patent No.: US 10,321,196 B2
(45) Date of Patent: Jun. 11, 2019

(54) METHODS AND SYSTEMS FOR CUSTOMIZING A MEDIA ASSET WITH FEEDBACK ON CUSTOMIZATION

(71) Applicant: Rovi Guides, Inc., Santa Clara, CA (US)

(72) Inventor: Brian C. Peterson, Barrington, IL (US)

(73) Assignee: Rovi Guides, Inc., San Jose, CA (US)

( * ) Notice: Subject to any disclaimer, the term of this patent is extended or adjusted under 35 U.S.C. 154(b) by 10 days.

(21) Appl. No.: 14/963,517

(22) Filed: Dec. 9, 2015

(65) Prior Publication Data

US 2017/0171631 A1   Jun. 15, 2017

(51) Int. Cl.
*H04N 21/44* (2011.01)
*H04N 21/45* (2011.01)
*H04N 21/81* (2011.01)
*H04N 21/84* (2011.01)
*H04N 21/462* (2011.01)
*H04N 21/472* (2011.01)
*H04N 21/482* (2011.01)
*H04N 21/845* (2011.01)

(52) U.S. Cl.
CPC ..... *H04N 21/4821* (2013.01); *H04N 21/4532* (2013.01); *H04N 21/462* (2013.01); *H04N 21/4622* (2013.01); *H04N 21/472* (2013.01); *H04N 21/84* (2013.01); *H04N 21/8456* (2013.01); *H04N 21/44008* (2013.01); *H04N 21/812* (2013.01)

(58) Field of Classification Search
CPC ........... H04N 21/4821; H04N 21/4532; H04N 21/462; H04N 21/472
See application file for complete search history.

(56) References Cited

U.S. PATENT DOCUMENTS

| 7,031,596 | B2 * | 4/2006 | Sai ....................... | G11B 19/022 |
| | | | | 348/E5.102 |
| 7,313,808 | B1 * | 12/2007 | Gupta .................. | G11B 27/034 |
| | | | | 348/E7.061 |
| 9,237,297 | B1 * | 1/2016 | Waddell ............. | H04N 5/44543 |
| 9,430,115 | B1 * | 8/2016 | Yun ......................... | G06F 3/048 |
| 2003/0110501 | A1 * | 6/2003 | Rafey .................. | G11B 27/105 |
| | | | | 725/46 |
| 2004/0109674 | A1 * | 6/2004 | Ohmori ................ | G11B 27/034 |
| | | | | 386/253 |
| 2005/0183111 | A1 | 8/2005 | Cragun et al. | |
| 2005/0198570 | A1 * | 9/2005 | Otsuka .................... | G11B 27/28 |
| | | | | 715/201 |
| 2006/0075454 | A1 * | 4/2006 | Jung .................... | G11B 27/034 |
| | | | | 725/135 |

(Continued)

*Primary Examiner* — Nathan J Flynn
*Assistant Examiner* — Tung T Trinh
(74) *Attorney, Agent, or Firm* — Haley Guiliano LLP

(57) ABSTRACT

Methods and systems are provided herein for a media guidance application that customizes media assets. In particular, the media guidance application may customize the media asset by condensing the media asset. The media guidance application may determine whether or not the condensed media asset omitted any desired parts of the media asset (e.g., one or more plot points of a movie; one or more parts of a movie featuring a specific actor or actress; one or more parts of a television show featuring comedy content), and alert the user about whether or not a desired part is omitted from the condensed media asset.

18 Claims, 12 Drawing Sheets

(56) References Cited

U.S. PATENT DOCUMENTS

| | | | |
|---|---|---|---|
| 2008/0092168 A1* | 4/2008 | Logan | G10H 1/0033 |
| | | | 725/44 |
| 2008/0250080 A1* | 10/2008 | Arrasvuori | G06F 16/435 |
| 2009/0063496 A1 | 3/2009 | Cunningham et al. | |
| 2010/0185628 A1* | 7/2010 | Weda | G11B 27/034 |
| | | | 707/752 |
| 2010/0192187 A1* | 7/2010 | Toebes | H04N 7/17318 |
| | | | 725/87 |
| 2011/0292244 A1* | 12/2011 | Deever | G11B 27/10 |
| | | | 348/231.2 |
| 2012/0054796 A1* | 3/2012 | Gagnon | H04N 5/602 |
| | | | 725/40 |
| 2012/0150927 A1 | 6/2012 | Ward et al. | |
| 2012/0259924 A1* | 10/2012 | Patil | H04L 65/4076 |
| | | | 709/206 |
| 2013/0297706 A1* | 11/2013 | Arme | H04N 21/4788 |
| | | | 709/206 |
| 2014/0101707 A1* | 4/2014 | Kishore | H04N 21/23439 |
| | | | 725/88 |
| 2014/0143713 A1 | 5/2014 | Gudorf et al. | |
| 2014/0298215 A1 | 10/2014 | Lawton et al. | |
| 2015/0113570 A1 | 4/2015 | Klarfeld et al. | |
| 2015/0154166 A1* | 6/2015 | Allen | G06F 16/34 |
| | | | 715/230 |
| 2015/0221336 A1* | 8/2015 | Deen | G11B 27/031 |
| | | | 386/290 |
| 2015/0229975 A1 | 8/2015 | Shaw et al. | |
| 2016/0014461 A1* | 1/2016 | Leech | H04N 21/4668 |
| | | | 725/14 |
| 2016/0373817 A1 | 2/2016 | Drake et al. | |
| 2016/0360247 A1 | 12/2016 | Shaw et al. | |
| 2017/0171623 A1 | 6/2017 | Peterson | |

* cited by examiner

600

```
600 ...
601 Initialization Subroutine
602 ...
603 //Routine to determine whether a plot point is omitted from a condensed media asset:
604
605 Retrieve a value that identifies a plot point
606 Retrieve instances of metadata of segments of a condensed media asset
607 For each instance of metadata of a segment of the condensed media asset
608     Retrieve the metadata's value that indicates whether any plot point is present in the segment
609     A = The retrieved metadata's value that indicates whether any plot point is present in
            the segment
610     B = The retrieved value that identifies the plot point
611     If (A = B)
612         Execute subroutine to determine that the plot point is not omitted from
            the condensed media
613         Exit iteration loop and proceed to Line 617
614
615 Execute subroutine to determine that the plot point is omitted from the condensed media
616 ...
617 Termination Subroutine
618 ...
```

800 ...
801 Initialization Subroutine
802 ...
803 //Routine to determine whether plot points of a media asset are omitted from a condensed media asset:
804
805 Receive instances of plot points of a media asset
806 For each instance of a plot point of the media asset:
807     Query a database containing entries, where each entry lists a segment of a condensed media asset, for matching entries, where each matching entry lists a segment in which the plot point is present
808         If (Number of matching entries > 0)
809             Execute subroutine to determine that the plot point is not omitted from the condensed media
810         Else
811             Execute subroutine to determine that the plot point is omitted from the condensed media
812 ...
813 Termination Subroutine
814 ...

1100 ...
1101 Initialization Subroutine
1102 ...
1103 //Routine to identify a portion of the media asset that corresponds to a content type selection criterion:
1104
1105 Receive a content type selection criterion that identifies a type of content that a user desires in a condensed media asset
1106 Retrieve instances of metadata of segments of a media asset
1107 For each instance of metadata of a segment of the media asset
1108     Retrieve the metadata's content type value that indicates a content type of the segment
1109     A = Accessed metadata's content type value
1110     B = Accessed value of the content type selection criterion
1111         If (A = B)
1112             Execute subroutine to add the segment to a portion of the media asset that corresponds to the content type selection criterion
1113 ...
1114 Termination Subroutine
1115 ...

1300 ...
1301 Initialization Subroutine
1302 ...
1303 //Begin routine to identify a portion of a media asset that corresponds to a content type selection criterion:
1304
1305 Receive a content type selection criterion that identifies a type of content that a user desires in a condensed media asset
1306 Access a first database listing time ranges of a media asset, wherein each of the time ranges corresponds to the content type selection criterion
1307 Retrieve instances of time ranges of the media asset that correspond to the content type selection criterion
1308 For each instance of a time range of the media asset that corresponds to the content type selection criterion
1309     Query a second database listing segments of the media asset and corresponding time ranges for segments whose corresponding time ranges match the retrieved time range that corresponds to the content type selection criterion
1310         If (Number of matching segments > 0)
1311             Execute subroutine to add the segment to a portion of the media asset that corresponds to the content type selection criterion
1312 ...
1313 Termination Subroutine
1314 ...

FIG. 13

METHODS AND SYSTEMS FOR CUSTOMIZING A MEDIA ASSET WITH FEEDBACK ON CUSTOMIZATION

BACKGROUND

In conventional systems, a consumer of a media asset can create a customized version of a media asset by selecting certain parts of a media asset to be included in the customized version. However, the user does not have an ability to receive any feedback on whether the customized media asset is an acceptable version based on, for example, whether a plot point is omitted from a condensed version of a time duration desired by the user. Furthermore, the user does not have an ability to set a criterion on, for example, a type of content of a media asset to be included or excluded in a customized media asset of a time duration desired by the user.

SUMMARY

Methods and systems are provided herein for a media guidance application that customizes media assets for users. In particular, the media guidance application may customize the media asset by condensing the media asset to include only scenes fitting a content type criterion (e.g., featuring plot points; featuring a specific actor or actress; featuring comedy content) selected by a user. Additionally or alternatively, the media guidance application may alert the user if any scene fitting the select criterion is omitted.

For example, the media guidance application may condense a media asset such that the media asset has a particular play length selected by the user. Moreover, the media guidance application may provide feedback in terms of whether or not the condensed media asset omitted any desired parts of the media asset (e.g., one or more plot points of a movie; one or more parts of a movie featuring a specific actor or actress; one or more parts of a television show featuring comedy content). For example, feedback can be in the form of a visual or auditory alert to the user. To provide feedback on whether or not the condensed media asset is an acceptable version, the media guidance application may determine, for example, whether or not a desired part of the media asset (e.g., a plot point) is omitted from the condensed media asset. The media guidance application may then alert the user about whether any desired part (e.g., a plot point) is omitted.

By providing a user with the ability to specify a particular play length and a content type selection to customize a media asset, the media guidance application enhances the entertainment experience of the user by conforming to her personal preferences. Further, by providing feedback on whether or not a condensed media asset is an acceptable version, the media guidance application increases the viewing efficiency of a user who may be busy but may nevertheless wish to enjoy a condensed version of the media asset without missing out on certain desired parts (e.g., plot points of a movie) of the media asset. Accordingly, users are more likely to consume a media asset customized with feedback in such a way as herein described as opposed to other media assets.

In some aspects, the media guidance application may receive a user selection of a media asset. For example, the media asset may have a plot point. Additionally or alternatively, the media asset may have a part that features a specific actor or actress. Further, to receive the user selection of the media asset, the media guidance application may provide a drop-down menu containing a repertoire of media assets that a user can select. Further, the media guidance application may receive a time duration for the media asset, wherein the time duration is less than a play length of the media asset. The media guidance application may receive the time duration as an input from a user. The time duration may be used to condense the media asset to generate a condensed media asset such that the condensed media asset corresponds to the time duration. For example, the media guidance application may provide a time bar for a user to input a desired time duration to condense the media asset.

The media guidance application may condense the play length of the media asset to correspond to the time duration to generate a condensed media asset. The condensed media asset may have a play length that is equal to the time duration inputted by the user. Alternatively, the condensed media asset may have a play length that is shorter than the time duration inputted by the user. For example, a media asset may also consist of segments or parts. Each segment or part may be a discrete or separable piece of a particular media asset. For example, in the context of a movie, each segment may be a scene in the movie. For example, each segment of a media asset may be identified by its corresponding metadata. Further, the metadata of each segment may indicate whether any desired part (e.g., a plot point; a scene featuring a specific actor or actress) is present in a segment. For example, metadata may include a value or data field that indicates whether any plot point is present in a segment.

The media guidance application may determine whether a desired part of the selected media asset (e.g., a plot points of a movie; a part of a movie that features a specific actor or actress; a part of a television show that features comedy content) is omitted from the condensed media asset. For example, the media guidance application may evaluate each metadata that indicates whether any desired part (e.g., any plot point) is present in a given segment to determine whether that desired part is found to be present in any of the segments of the condensed media asset. For example, the media guidance application may compare the identification number of the plot point of interest to each segment's metadata's value that indicates whether any plot point is present in a segment. For example, an identification number of "2" means that the plot point of interest is the second plot point in the plot sequence of a story. Further, a segment's metadata's value that indicates whether any plot point is present in a segment may be "3," which identifies that a plot point is present in the given segment, and that this plot point is the third plot point in the plot sequence of a story. Taking this example further, because the identification number of "2" for the plot point of interest is different from the segment's metadata's value ("3"), the media guidance application may determine that the plot point of interest is not present in this given segment, and may move on to evaluate a next segment's metadata's value that indicates whether any plot point is present in the next segment.

Further, the media guidance application may retrieve the time range from the metadata of each of the segments of the condensed media asset, and also the beginning time and the end time of the desired part (e.g., the plot point of interest). For example, by comparing the retrieved the beginning time and end time of the plot point of interest to the time range of the metadata of each segment, the media guidance application may determine whether the plot point of interest is included in any of the segments of the condensed media asset.

Moreover, the media guidance application may retrieve entries from a database, where each entry lists a segment of the condensed media and a corresponding value indicating whether any desired part (e.g., any plot point) is present in the segment. Then, for example, the media guidance application may identify whether a plot point of interest is present in the segment listed in each entry of the database based on the corresponding value indicating whether any plot point is present in the segment.

The media guidance application may also determine a number of omitted desired parts (e.g., plot points; parts of a movie that feature a specific actor or actress), which are not present in the condensed media asset. For example, by comparing the number of omitted plot points against a maximum amount of plot points that are allowed to be omitted from the condensed media asset, the media guidance application may then determine whether the number of the omitted plot points is greater than the maximum amount. Based on the result of this determination, the media guidance application may then provide an appropriate alert to the user. For example, if the number of omitted plot points is greater than the maximum amount, the alert may inform the user that the condensed media asset is not acceptable by displaying a text shown on a user interface, or changing the color of the background of the interface to red. As a further example, the alert may be in the form of a somber sound that indicates that the number of omitted plot points is greater than the maximum amount of plot points that are allowed to be omitted, and the sound may become pleasant when the opposite is true. To determine the number of omitted plot points, the media guidance application may compute the difference between the total number of all plot points of the media asset and a count of plot points that are included in the condensed media asset.

Further, the media guidance application may determine a rating that corresponds to the number of the omitted desired parts (e.g., plot points; parts of a movie that feature a specific actor or actress). For example, the determined rating may measure the adequacy of the condensed media asset in terms of the number of plot points that are omitted. The rating may be determined by comparing the number of the omitted plot points with a plurality of threshold values. In some embodiments, the media guidance application may provide different ratings by displaying different colors. Additionally or alternatively, the media guidance application may provide different ratings by generating different sounds.

In some other aspects, the media guidance application may receive a user selection of a media asset, a time duration to condense a media asset, wherein the time duration is less than the play length of the media asset, and one or more content type selection criteria, wherein each content type selection criterion identifies a type of content that the user desires in a condensed media asset. For example, such a selection criterion may provide a user with the ability to choose the appropriate segments of an original media asset that match the selection criterion to be included in or excluded from a condensed version. For example, the selection criterion may impose a requirement to not drop scenes that contain plot points of a movie from the shortened version. Such a selection criterion may also provide a user with the ability to specify the exact content to be included or excluded. For example, the selection criterion may specify that, for a recorded baseball game, only the parts of the game where the home team players were batting should be included in the shortened version. As another example, a user selection criterion may specify that, for a recorded baseball game, only the last three innings of the game should be included in the shortened version. In some embodiments, a type of content that a user desires in a condensed media asset may be a genre. For example, a genre may be drama, action, romance or comedy.

Based on one or more content type selection criteria, the media guidance application may identify a portion of the media asset that corresponds to the content type selection criterion. For example, a media asset may consist of a plurality of segments. The media guidance application may determine, from the plurality of segments, a group of matching segments as the portion of the media asset that corresponds to the content type selection criterion. For each of the plurality of segments, the media guidance application may retrieve a corresponding metadata, wherein each metadata includes a content type value that indicates a content type of a segment of the media asset. The content type value of the metadata of a segment may indicate that the segment contains comedy content. By evaluating the content type value of the metadata of each segment of the media asset, the media guidance application may be able to identify those segments whose content type values match the content type selection criterion. Those identified segments may then form the portion of the media asset that corresponds to the content type selection criterion.

There are other ways to identify a portion of the media asset that corresponds to the content type selection criterion. For example, the media guidance application may retrieve from a first database time ranges of the media asset that correspond to the content type selection criterion. The media guidance application may compare each of these time ranges that correspond to the content type selection criterion against each of the time ranges corresponding to the segments of the media asset to determine those segments that match the content type selection criterion. For example, the media guidance application may evaluate whether a given time range corresponding to the content type selection criterion from the first database overlaps with a particular segment's corresponding time range.

Moreover, for the identified segments that form a portion of the media asset that corresponds to the content type selection criterion, the media guidance application may determine the total play time of these identified segments, which may also be the play length of the portion. If the play length of the identified portion is less than or equal to the time duration desired by the user, the media guidance application may generate a condensed media asset that includes the portion.

The media guidance application may also alert a user in response to determining that the play length of the portion corresponding to the content type selection criterion is greater than the time duration desired by the user. For example, the media guidance application may alert a user when a media asset is two hours in duration and the portion of the media asset that corresponds to the content type selection criterion (e.g., comedy content) has a play length of thirty (30) minutes, but the time duration inputted by the user is only twenty (20) minutes. For example, the media guidance application may provide an alert by changing the background color of the user interface. As another example, the media guidance application may provide an alert through a sound.

Further, if the play length of the identified portion corresponding to the content type selection criterion is less than the desired time duration, the media guidance application may also identify an additional portion of the media asset to be included in the condensed media asset, wherein the additional portion of the media asset may not correspond to the content type selection criterion. The additional portion may be content that is not specifically selected by the user based on the content type selection criterion, but may be related (but not corresponding) to the content type selection criterion. For example, even though a content type selection criterion is the home team's homerun highlights of a baseball game, an additional portion of the media asset that does not correspond to the content type selection criterion may be the visiting team's homerun highlights.

For a media asset that may consist of a plurality of segments, the media guidance application may determine a group of segments as the additional portion of the media asset that does not correspond to the content type selection criterion. For each of the plurality of segments, the media guidance application may retrieve a corresponding metadata, wherein each metadata includes a content type value that indicates a content type of a segment of the media asset. By evaluating the content type value of the metadata of each segment of the media asset, the media guidance application may be able to identify those segments whose content type values do not match the content type selection criterion. Those identified segments may then form the additional portion of the media asset that does not correspond to the content type selection criterion. Moreover, to identify an additional portion of the media asset that does not correspond to the content type selection criterion, the media guidance application may also retrieve from a first database time ranges of the media asset that do not correspond to the content type selection criterion. The media guidance application may compare each of these time ranges that do not correspond to the content type selection criterion against each of the time ranges corresponding to the segments of the media asset to determine those segments that do not match the content type selection criterion.

Moreover, the media guidance application may also identify supplemental content for inclusion in the condensed media asset, wherein the supplemental content may describe subject matter of the condensed media asset, and wherein the supplemental content may not increase the play length of the condensed media asset. Supplemental content may be content not included in a media asset from which the condensed media asset is generated. For example, the supplemental content identified may be a textual description of one or more scenes of the condensed media asset. As another example, the supplemental content identified may be "Cliff's Notes" on one or more scenes of the condensed media asset. As a further example, the supplemental content identified may be a still image that represents one or more scenes of the condensed media asset. In some embodiments, the play length of the condensed media asset may correspond to the desired time duration, which may be longer than the play length of the portion corresponding to the content type selection criterion. In that case, the play length of the condensed media asset may accommodate the time length of the supplemental content identified by the media guidance application without necessitating the need to increase the play length of the condensed media asset.

There are several ways to identify supplemental content to be included in a condensed media asset. For example, the media guidance application may receive a supplemental content type selection criterion identifying a type of supplemental content that the user desires in the condensed media asset. The media guidance application may then select supplemental data describing the subject matter of the condensed media asset and corresponding to the supplemental content type selection criterion.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode of an illustrative process for determining whether a plot point is omitted from a condensed media asset in accordance with some embodiments of the disclosure;

FIG. 8 is pseudocode of an illustrative process for determining whether plot points of a media asset are omitted from a condensed media asset in accordance with some embodiments of the disclosure;

FIG. 11 is pseudocode of an illustrative process for identifying a portion of the media asset that corresponds to a content type selection criterion in accordance with some embodiments of the disclosure;

FIG. 13 is pseudocode of an illustrative process for identifying a portion of a media asset that corresponds to a content type selection criterion in accordance with some embodiments of the disclosure.

DETAILED DESCRIPTION

Figure 1:
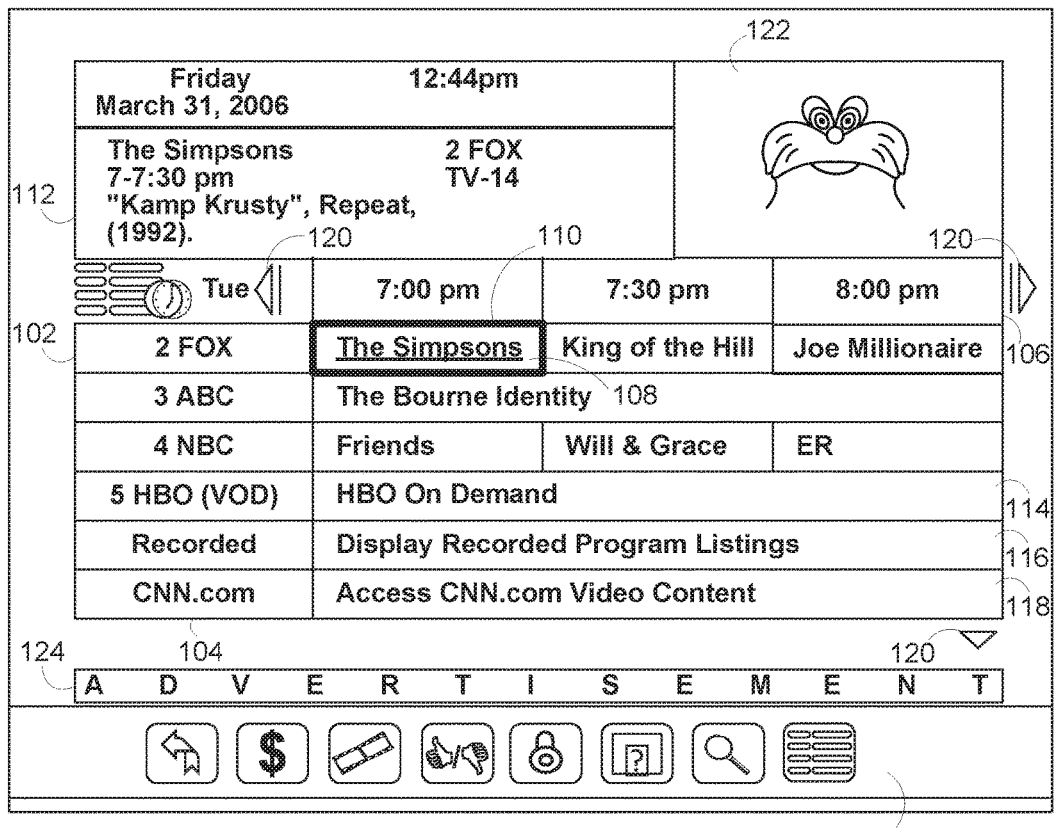
FIG. 1 shows an illustrative example of a display screen generated by a media guidance application in accordance with some embodiments of the disclosure.

Methods and systems are provided for a media guidance application that customizes a media asset and provides feedback regarding the customized media asset to a consumer. As discussed herein, the media guidance application may provide feedback to a user about whether the customized media asset is an acceptable version of the original media asset. For example, a customized media asset may be a condensed version of the media asset, and the media guidance application may provide an alert about whether any desired part (e.g., any plot point; any part of a movie that features a specific actor or actress; any part of a television show featuring comedy content) is omitted from the condensed media asset. In some embodiments, as feedback to the user, the media guidance application may provide an alert about whether the number of desired parts (e.g., plot points) that are omitted from the condensed media asset exceeds the maximum amount of plot points that are allowed to be omitted from the condensed media asset.

By providing a user with a way to customize (e.g., by condensing) a media asset according to a desired time duration, and by providing feedback on the customized media asset, the media guidance application enhances a user's entertainment experience and increases the viewing efficiency. For example, a user may have a busy work and life schedule, but may nevertheless wish to enjoy a media asset with the time that is available to her for entertainment. In that case, she may benefit from viewing, for example, a condensed version of a media asset while having the ability to specify a desired time duration, which can be adjusted by the user at will. Accordingly, users are more likely to consume a media asset that can be customized in such a way as herein described as opposed to other media assets.

The amount of content available to users in any given content delivery system can be substantial. Consequently, many users desire a form of media guidance through an interface that allows users to efficiently navigate content selections and easily identify content that they may desire. An application that provides such guidance is referred to herein as an "interactive media guidance application" or, sometimes, a "media guidance application" or a "guidance application."

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the term "media asset" may mean a consumable asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. A media asset may be a single episode of a television program. A media asset may also be a standalone movie. Further, a media asset may consist of multiple episodes of a television program. A media asset may also consist of multiple seasons of a program. Further, a media asset may also consist of multiple movies of a movie series.

As referred to herein, a "plot" of a media asset may be a series of significant events that advance the development of the story in a media asset. For example, a plot may be a collection of important scenes that have an impact or important consequence on an entire story. A plot may be the storyline of a novel or a movie. A plot may be a sequence of the main events in a story. A plot may also be a summary of a story.

As referred to herein, a "plot point" of a media asset may be a part of a plot. A plot point may be one of the significant events in a story that advance the development of the story. For example, a plot point may be contained in a scene that has an impact or important consequence on the entire story of a media asset. For example, a plot point may be contained in a scene related to the beginning, where a conflict arises. For example, a plot point may be contained in a scene related to the middle, where the story reaches its climax. For example, a plot point may be contained in a scene related to the end, where the conflict is resolved. A plot point may also be identified or distinguished from other plot points by its identification number. An identification number of a plot point may refer to the order of the plot point within the plot. For instance, a plot may have three plot points, namely the first plot point (e.g., the beginning of a story), where a conflict of the story arises, the second plot point (e.g., the middle of a story), where the story reaches its climax, and the third plot point (e.g., the end of a story), where the conflict is resolved. In that case, an identification number of "1" for a plot point indicates that the plot point is the first plot point, an identification number of "2" for a plot point indicates that the plot point is the second plot point, and an identification number of "3" for a plot point indicates that the plot point is the third plot point. Further, a plot point may span more than one segment of a media asset. For example, a particular long plot point may be present in three segments or scenes of a media asset. Additionally or alternatively, one single segment or scene may also contain more than one plot point. Moreover, in the context of television program that lasts for several episodes and/or seasons, a plot point may span more than one episode and/or season. Further, a plot point may span multiple episodes that may not be consecutive.

As referred to herein, a "time bar" may be an interactive object that may provide both control and information to a user. A time bar may be a horizontal bar with an indicator (or a slider) by which a user can move left or right to adjust a desired time duration used to customize (e.g., to condense) an original media asset. A time bar may also be a vertical bar with a indicator by which a user can move up or down to adjust a desired time duration used to customize (e.g., to condense) an original media asset. A horizontal or vertical time bar may be shown on a traditional display such as a television, or a portable touchscreen device such as a smart phone, or both. When a time bar is shown on a traditional television screen, a user can input a desired time duration using a remote control. By way of an example, the user may navigate, using the arrow keys of the remote control, to reach a horizontal time bar indicator on the screen. After pressing the selection key of the remote control, the time bar is selected. With the time bar as the selected object on the screen, the user can press the left arrow key of the remote control to decrease the desired time duration, or the right arrow key to increase the desired time duration. As another example, a time bar may be shown on a touchscreen display such as a smart phone. For example, when a time bar is shown on the touchscreen of the smart phone, using finger gestures and tapping, a user can input a desired time duration.

Additionally or alternatively, a time bar may provide a time counter for the desired time duration. For example, as a user adjusts the desired time duration by, for example, moving the indicator left or right of a horizontal time bar, the time counter, which may be digital, also changes its second, minute and/or hour time digits. In that case, the user may be able to immediately view the desired time duration that she has selected by using the indicator. Additionally or alternatively, a time bar may also provide markings of time gauges that are evenly spaced from each other. In that case, for instance, time gauges of "0," "0:30," "1:00," "1:30," "2:00" and "2:30" may be displayed evenly from each other, and simultaneously with the horizontal time bar.

A time bar may provide an alert about whether a condensed version of the media asset is acceptable. For example, a time bar may alert a user that the condensed version is acceptable by displaying a green color. In contrast, the time bar may alert a user that the condensed version is not acceptable by displaying a red color. Additionally or alternatively, the time bar may also provide a descriptive text that reflects whether the condensed version is acceptable or satisfactory. For instance, the descriptive text may display the word "acceptable" when the condensed version does not omit any desired part (e.g., any plot point) of a movie. In contrast, the descriptive text may display the word "not acceptable" when the condensed version omits a desired part (e.g., plot point) due to the time duration constraint imposed by the user. A time bar is not limited to a horizontal or vertical shape. A time bar may also be in other forms. For example, a time bar may be in the shape of a circular dial, which a user may manipulate to set a desired time duration.

As referred to herein, a "segment" may be a part of a media asset. For example, a segment may be a scene or act within a movie. As another example, a segment may be an inning in a baseball game. As yet another example, a segment may be an episode of a season of a television program. In some embodiments, a segment may also consist of multiple episodes of a season of a television program. Further, a media asset may be composed of one or more segments. Each segment may be delimited by a start time and end time. For example, a segment may be a scene that took place at a particular location during a particular time in a movie. Further, each segment that is an episode of season of a television program may be delimited by the start and finish markers of the episode. Furthermore, the segments of a media asset may or may not be of the same length. One segment may be longer or shorter than another segment of the same media asset. Moreover, the division of the portions of an original media asset may be predetermined. For example, the division of a media asset into segments may have already been set when the media guidance application receives a user selection of a media asset to be condensed. Alternatively, the division may be performed by the media guidance application upon receiving a user selection that indicates a media asset to be condensed. For example, the media guidance application may divide a media asset based on a periodic time interval, meaning that each segment may be of the same length. The media guidance application may also analyze the content of a media asset, and divide it into segments based on, for example, a scheme that separates scenes where a star actress appears from those where she does not.

Further, a segment may contain a desired part (e.g., a plot point) of a selected media asset. For example, a desired part (e.g., a plot point) of the selected media asset may last for the entire length of a particular segment. Further, a desired part (e.g., a plot point) may occupy any time portion of a particular segment. In some embodiments, a segment may contain two or more plot points. In some other embodiments, one particular plot point may span two or more segments. For example, a long plot point may be present in two segments of a media asset. In some other embodiments, the metadata corresponding to a particular segment may, for example, contain a value that may simply indicate whether any plot point is present in that segment. The value may be numeric, with a value of "1" being indicative that the segment contains the first plot point, a value of "2" being indicative that the segment contains the second plot point, and so forth.

A segment of a media asset may physically reside in a hard drive of a local user device. Additionally or alternatively, a segment of a media asset may physically reside in a remote storage server. Moreover, a segment of a media asset may be identified by corresponding metadata, which may contain information on the characteristics or attributes of each segment, such as information on start and end times of the each segment.

As referred to herein, "metadata" may be data that provides information about other data. Metadata of a segment of a media asset may describe the characteristics or attributes of that particular segment. Metadata may contain multiple values related to different information. Metadata may also contain multiple data fields related to different information. For example, metadata may provide information on the identification, type, content, purpose, time duration, parental control rating and/or other pertinent attributes of the particular segment. Further, the metadata of a segment may also contain a value that indicates whether a desired part (e.g., a plot point) is present in the segment. For example, a value that indicates whether a plot point is present in the segment may be "3," meaning that this plot point is the third plot point in a plot with several plot points, and that a plot point is present in that particular segment. As another example, the value that indicates whether a plot point is present in the segment may be a "NULL" value, which may indicate that no plot point is present in that particular segment.

Additionally or alternatively, metadata may include a content type value that indicates a content type of a segment of the media asset. For example, the content type value may indicate whether a certain actor or actress appears in the corresponding segment. Further, metadata may also include a data field that provides a summary for the synopsis of the segment. Moreover, the metadata of a segment may also include another data field that provides, for example, the name(s) of the actor(s) and/or actress(es) who appear in that segment. As another example, metadata may also include a value that provides the information on the associated segment's physical location in the memory of a local device or in the memory of a remote device, such as information that identifies the related sector, block, and/or cluster in memory.

Metadata may also provide content organization information, such as information on how the segments of a media asset are divided in terms of their start times and end times. Further, the metadata of a segment may also provide information about the time and date of creation, size, color depth, or resolution of the segment. In some embodiments, metadata itself may be stored in memory, which may be non-volatile or volatile. Further, metadata may be stored and organized in one or more databases.

As referred to herein, a "rating" may be a measurement by which a condensed media asset may be evaluated. A rating may measure the adequacy of a condensed media asset. For example, when an original (full-version) media asset has been condensed in time duration according to a desired time duration inputted by a user, a rating may measure whether the condensed media asset is an acceptable version. For instance, the media guidance application may assign a grade or score of "superior," "average," or "inferior" to a condensed media asset with a particular number of desired parts (e.g., plot points) that are omitted from the condensed media asset.

There are multiple ways by which the media guidance application may determine a "rating." For example, a user may input a desired time duration of thirty (30) minutes to condense a media asset (e.g., a movie) that is two (2) hours and thirty (30) minutes (or 150 minutes) in play length. The movie may be made of fifteen (15) segments or parts, each of which is ten (10) minutes in duration, for a total of 150 minutes. Further, the story in the movie may have, for example, a total of five (5) plot points (e.g., five (5) events of significance that advance the development of the story in the movie), which are each five (5) minutes in duration, and located at the $20^{th}$ minute, the $50^{th}$ minute, the $80^{th}$ minute, the $110^{th}$ minute, and the $140^{th}$ minute. Based on the foregoing information, the media guidance application may generate a condensed media asset by reducing the play length of the media asset from 150 minutes to 30 minutes by including only three (3) segments (each ten (10) minutes in duration) that each contain a plot point. These three (3) segments may be the first three (3) segments with plot points, namely, the segments located at the $20^{th}$ minute, the $50^{th}$ minute, the $80^{th}$ minute of the media asset. In other words, the segments at the $110^{th}$ minute and $140^{th}$ minute that contain the remaining two (2) plot points are not included in the condensed media asset, and these two (2) plot points are thus omitted from the condensed medial asset. Thus, the number of plot points that are omitted from the condensed media asset is two (2) in this example.

By comparing the number of omitted plot points against a set of thresholds or alert levels (e.g., "superior" if the number of omitted plot points is less than or equal to 1; "average" if the number of omitted plot points is between 1 and 4; and "inferior" if the number of omitted plot points greater than or equal to 4), the media guidance application may determine, for example, that the rating for this particular condensed version is "average" since there are two (2) plots points that are omitted from the condensed version in the previous example.

The media guidance application may receive a user selection of a media asset. In some embodiment, the selected media asset may have a plot point. In some other embodiments, the selected media asset may have a part that features a specific actor or actress. The selected media asset may also have a part that features comedy content. Further, the selected media asset may also have other parts that are of interest to a user, including romance, drama, action, suspense, musical, and/or horror contents. In yet some other embodiments, the selected media asset may also contain sport event highlights, such as clips featuring homeruns of a baseball game. There may be multiple ways for the media guidance application to receive such a user selection. For example, the media guidance application may provide a preloaded drop-down menu containing a list or a repertoire of available media assets that a user may select. For example, the list or the repertoire may be organized alphabetically by the titles of the available media assets that a user can consumed. Additionally or alternatively, the list or the repertoire may be organized by genres of the media assets. The list or the repertoire may also be organized by ranges of the time lengths of the media assets. The list or the repertoire may further be organized by types of the media assets, such as movies, TV series, short clips, documentaries, sport events, and news. In some embodiments, each entry of the list or the repertoire may contain information other than the title of the media asset. For example, each entry may contain the name of the leading actor or actress, the release date, and/or the time length of the media asset. Further, the drop-down menu may contain a single or multiple columns of available media assets. Using the drop-down menu, a user may navigate through the list or the repertoire by, for example, pressing the left, right, up and/or down arrow keys of a remote control. For example, once the desired entry from the drop-down menu is highlighted, the user may make a selection of a desired media asset by pressing the "OK" key of the remote control.

Additionally or alternatively, the media guidance application may also provide a text field for a user to input a string of one or more characters for the title of a media asset. For example, based on a user input of a text string for the title of the desired media asset to be condensed, the media guidance application may search through a database of media assets for a match. In some embodiments, for the media guidance application to identify the correct title of a media asset from a database, the exact title of the desired media asset may not need to match perfectly the user's input, as some differences may be tolerated. Further, the media guidance application may also tolerate misspellings or typos in the user's input of the title of a media asset, and may provide a corrected title for a user to confirm. As a further example, the media guidance application may also provide an auto completion function in conjunction with the text field where a user may input a partial title of a media asset. The auto completion function may start providing suggestions of titles of media assets as a user has sufficiently inputted part of the desired title. The user may then select one of the suggestions without having to type out the entire title.

Additionally or alternatively, the media guidance application may also provide buttons to receive a user selection of a media asset. For example, each button may correspond to the title of a media asset, and may display the title on button itself. A user may make a selection of the desired media asset by, for example, navigating to the corresponding button by pressing the left, right, top and/or down arrow keys of the remote control, followed by pressing the "OK" key of the remote control.

Further, a selected media asset may include one desired part (e.g., a plot point) or several desired parts (e.g., plot points). A desired part (e.g., a plot point) of a selected media asset may be located in any time range within the play length of the selected media asset. A time range of a desired part (e.g., plot point) may be of any time duration. In some embodiments, a desired part (e.g., a plot point) may be contained within a segment of the selected media asset. In some other embodiments, a desired part (e.g., a plot point) may span more than one segment of the selected media asset.

A selected media asset may include at least one segment. Each segment may be a discrete piece of a particular media asset. For example, a segment may be delimited by a start time and end time. In some embodiments, each segment of a media asset may be delimited by a fixed time period. To illustrate, a two-hour movie with 15-minute segments has eight of such equally long segments. In some embodiments, segments may also be of different lengths. To illustrate, each of the nine innings of a baseball game may be a segment, and some of these nine segments may be of unequal time lengths. Moreover, the division of the media assets into different segments may be predetermined prior to being selected by a user. For example, the division of the segments may have already been set when the media guidance application receives a user selection of a media asset to be condensed. Furthermore, each segment of a media asset may be associated with its corresponding metadata, which may already contain information on the predetermined division. In that case, information on how the media asset is divided is readily available to the media guidance application based on metadata.

In some embodiments, a media asset's segments may be stored in a local user device. In that case, such segments may, for example, physically reside in a hard drive of the local user device. Such a hard drive may be of different types, such as a solid-state drive, or alternatively, a magnetic hard disk. Further, a media asset's segments may also be stored in an external device that is attachable and detachable from the local user device. For example, a media asset's segments may be stored on an external hard drive that serves as an extra storage device for a digital video recorder device. Additionally or alternatively, a media asset's segments may also be stored on a DVD disk that is accessible by the local user device through a DVD reading device.

Furthermore, each segment of the media asset may have companion or corresponding metadata. Each segment may be identified by its corresponding metadata. For example, one of the fields of the corresponding metadata for a particular segment may contain the information of the memory location where that portion is stored on a hard drive of a local user device. The use of metadata may provide one way for the media guidance application to identify one or more segments of the media asset in order to select them.

In some embodiments, a media asset may be stored in a remote device. In that case, the content of the media asset may, for example, physically reside in a remote storage server of a content provider such as a cable operator. Such a remote storage server may, for example, contain multiple solid-state drives and/or magnetic hard disks. Furthermore, each segment of the media asset stored on a remote storage server may be identified by its corresponding metadata. For example, one of the fields of the corresponding metadata for a particular segment may contain the information of the network location where that portion is stored on a remote device. The use of metadata may provide one way for the media guidance application to identify one or more segments of the media asset that are located remotely. Further, a media asset may be stored on the Internet or in the "cloud." The media guidance application may receive each of the segments of a media asset stored on a remote device by streaming or downloading to a local user device.

The media guidance application may receive a time duration for the media asset, wherein the time duration is less than a play length of the media asset. The time duration may be inputted by a user, and may represent the desired amount of time in which the user wants to view the media asset. Based on the time duration, the media guidance application may condense an original media asset into a condensed version that corresponds to the time duration. In some embodiments, the condensed version may be of the exact same time length as the time duration desired by the user. However, in some other embodiments, the condensed version may be of a time length that is shorter than the time duration.

In some embodiments, the media guidance application may provide a time bar to a user for her to input a desired time duration to condense the original media asset. In some embodiments, the media guidance application may provide a time bar in the form of a timeline bar that a user can interactively control to set the desired time duration that is used to shorten the original media asset. For example, a time bar may be a horizontal timeline with a time setting indicator or slider. In that case, a user may conveniently set the desired time duration by moving the indicator toward the left to decrease the desired time duration or move the slider toward the right to increase the desired time duration. For example, the time bar may also be a circular dial that a user can control and then select the desired time duration. Based on a user's input through a time bar, the media guidance application may receive a time duration used to condense a media asset.

In some embodiments, the media guidance application may condense the play length of a media asset to correspond to a time duration to generate a condensed media asset. For example, the media guidance application may receive a desired time duration of twenty (20) minutes to condense an original media asset (e.g., a movie) that is three (3) hours (or 180 minutes) in play length. The movie may be made of eighteen (18) segments or parts, each of which is ten (10) minutes in duration, for a total of 180 minutes. Further, the story in the movie may have, for example, a total of five (5) plot points, which are each five (5) minutes in duration, and located at the $45^{th}$ minute, the $60^{th}$ minute, the $110^{th}$ minute, the $120^{th}$ minute, and the $170^{th}$ minute. One way to condense a media asset is based on selecting and including only those segments that contain plot points into the condensed media asset. In that case, the media guidance application may generate a condensed media asset by reducing the play length of the original media asset from 180 minutes to 20 minutes by including only two (2) segments (ten (10) minutes each in time duration) that each contain a plot point. In this example, even though each plot point may be only five (5) minutes in duration, each segment may be ten (10) minutes in time duration and undividable. Thus, the media guidance application may only be able to select by segments in condensing the media guidance application. Due to the twenty-minute time duration constraint imposed by the user, the media guidance application may only be able to include, in the condensed media asset, two (2) segments of ten (10) minutes that each contain a plot point. These two segments may be the first two segments with plot points, namely, the segment located at the $40^{th}$ minute (which includes the plot point that lasts from the $45^{th}$ minute to the $50^{th}$ minute), and the segment located at the $60^{th}$ minute (which includes the plot point that lasts from the $60^{th}$ minute to the $65^{th}$ minute). Alternatively, the media guidance application may select the last two segments with plot points to be included in the condensed media asset, namely, the segment located at the $120^{th}$ minute (which includes the plot point that lasts from the $120^{th}$ minute to the $125^{th}$ minute), and the segment located at the $170^{th}$ minute (which includes the plot point that lasts from the $170^{th}$ minute to the $175^{th}$ minute).

In some embodiments, the media guidance application may utilize the metadata associated with each segment to identify the appropriate segments containing desired parts (e.g., plot points of a movie; parts of a movie featuring a specific actor or actress; parts of a television show featuring comedy content) to be included in the condensed media asset. For example, by using the metadata of each segment, the media guidance application may select and assemble each segment that contains a plot point into a condensed media asset, which has a time length that corresponds to the time duration desired by the user. For segments of a media asset that are stored on a local user device, the media guidance application may, for example, generate a condensed media asset by creating an ensemble of links that may point to the various selected segments that contain plot points. Such links may, for example, indicate the memory locations of the selected segments as specified in the corresponding metadata. Alternatively, the media guidance application may, for example, generate a condensed version by creating in the local storage a new copy of each of the selected segments that contain plot points, and rearrange them as a condensed media asset.

In some embodiments, the media guidance application may generate a condensed media asset that has a time length that is less than the time duration inputted by a user. For example, there may be a small number of desired parts (e.g., plot points) in a movie, and thus the number of segments that contain desired parts (e.g., plot points) may be small. Thus, the total time length of these segments may be short. In that case, the time length of the condensed media asset that is composed of these segments may be shorter than the time duration desired by the user.

In some embodiments, the media guidance application may generate a condensed media asset based on periodic portion selection of segments. For example, periodic portion selection may be a way to select one or more segments by selecting each segment at a constant interval time. In the context of a soccer game, which may last 90 minutes, periodic portion selection may select segments of the game based on a 15-minute time interval, namely, at 0 minute (kickoff), $15^{th}$ minutes, $30^{th}$ minute, $45^{th}$ minutes (halftime), $60^{th}$ minute, $75^{th}$ minute, and $90^{th}$ minute (end of the game). In this example, the media guidance application may select a clip of a certain length (e.g. 20 seconds) beginning at each of the seven foregoing time marks, and generate a condensed media asset that includes these seven clips.

In some embodiments, the media guidance application may generate a condensed media asset based on character appearance selection. For example, in the context of a TV series, character appearance portion selection may be a way to select one or more segments according to a user's fondness for a particular character in the TV series. In that case, the media guidance application may select for inclusion into the condensed version all of the segments of an episode of the TV series where the particular character appears. As another example, in the context of a movie, the media guidance application may generate a condensed media asset based on a special interest selection. For instance, a special interest selection may be based on a user's fondness for comedy scenes. In that case, the media guidance application may select for inclusion into a condensed media asset all of the scenes of the movie where there is comedy content. As another example, in the context of a baseball game, special interest selection may be based on a user's fondness for viewing homeruns. In that case, the media guidance application may select for inclusion into a condensed media asset all of the clips of the baseball game that display homeruns. Further, in each of the foregoing examples, the media guidance application may also determine whether any segment matching a selection criterion (e.g., character appearance selection; special interest selection) is omitted from the condensed media asset, and then may alert the user about whether any segment matching the selection criterion is omitted.

In some embodiments, for the selected segments of the media asset that are stored on a remote device in a network, the media guidance application may, for example, generate a condensed version by creating an ensemble of links that may point to the various selected segments stored remotely. Such links may, for example, indicate the network locations of the selected segments as specified in the respective location fields of the corresponding metadata. Alternatively, the media guidance application may, for example, generate a condensed version by first downloading into the local storage a new copy of each of the selected segments, and then assemble them into a condensed media asset.

The media guidance application may determine whether the desired part (e.g., the plot point of interest) is omitted from the condensed media asset. For example, the media guidance application may retrieve each segment's metadata that indicates whether any plot point is present in the particular segment of a condensed media asset, and the identification number of the plot point of interest. The media guidance application may then compare the identification number of the plot point to each of the metadata to determine whether the plot point of interest is included in the condensed media asset. In some embodiments, the metadata of each segment of a condensed media asset may include a value (or data field) that indicates whether any plot point is present in the segment. The media guidance application may compare each value against the identification number of the plot point of interest by an arithmetic operation to determine whether there is a match. If the media guidance application detects there is at least one match, then it may record the result of the determination that the plot point at issue is not omitted from the condensed media asset. Further, if the media guidance application does not detect any match after evaluating the value of every segment of the entire condensed media asset, then it may also record the result of the determination that the plot point at issue is omitted from the condensed media asset.

In some embodiments, to determine whether a desired part (e.g., a plot point of interest) is omitted from a condensed media asset, the media guidance application may retrieve the time range of each segment of the condensed media asset, and the beginning time and the end time of the desired part (e.g., the plot point of interest). The time range of each segment may, for example, indicate the start and end time marks of the segment. For example, the media guidance application may then compare each segment's start and end time marks against the beginning time and end time of the plot point at issue to determine whether the plot point at issue is included in any of the segments of the condensed media asset. In some other embodiments, the media guidance application may determine that the time range as determined by the beginning time and end time of the plot point at issue is within the time range of a particular segment. In that case, the media guidance application may determine that this particular segment contains the plot point at issue, and thus the plot point at issue is not omitted from the condensed media asset. Further, the media guidance application may determine that the time range of the plot point is not completely contained within the time range of any segment of the condensed media asset. In that case, the media guidance application may make a determination that the plot point at issue is omitted from the condensed media asset.

In some embodiments, to determine whether a desired part (e.g., a plot point) is omitted from a condensed media asset, the media guidance application may retrieve entries of a database stored in memory, where each entry lists a segment of the condensed media asset, and its corresponding value indicating whether any desired part (e.g., any plot point) is present in the segment. For example, to determine whether the plot point of interest is included in a condensed media asset, the media guidance application may compare the identification number of the plot point of interest with the corresponding value indicating whether any plot point is present in each segment of the condensed media asset.

The media guidance application may alert a user about whether the desired part (e.g., the plot point of interest) is omitted in response to the determination of whether the plot point is omitted from the condensed media asset. For example, when the plot point at issue is omitted from the condensed media asset, the media guidance application may alert a user about this determination by showing a message to that effect on a display. Additionally or alternatively, the media guidance application may alert the user by changing the background color of the display to red, and/or changing the color of a time bar.

In some embodiments, the media guidance application may also determine a number of desired parts (e.g., plot points) that are omitted from the condensed media asset. For example, the media guidance application may then retrieve a maximum amount of plot points that are allowed to be omitted from the condensed media asset. The media guidance application may consequently determine whether the number of plot points that are omitted from the condensed media asset is greater than the maximum amount of plot points that are allowed to be omitted from the condensed media asset. Based on this determination, the media guidance application may alert the user regarding a result of the determination.

In some embodiments, to determine a number of desired parts (e.g., plot points) that are omitted from the condensed media asset, the media guidance application may retrieve the metadata of each segment of the condensed media asset, and the total number of plot points of the media asset. The metadata of each segment may include a value that indicates whether any plot point is present in a segment. By accessing and evaluating this value for each segment, the media guidance application may determine a count of plot points that are present in the segments of the condensed media asset. In some cases, a plot point may span two segments, and each of these two segments may have the same value that indicates the same plot point is present. In such cases, the media guidance application may determine that only one plot point is included by these two segments for the purposes of calculating the count of plot points that are included in the condensed media asset. The total number of plot points of the media asset may be predetermined and retrieved by the media guidance application. For example, the media guidance application may retrieve a total number of plot points of the media asset from a database. The media guidance application may input the title of the media asset into the database to obtain the corresponding total number of plot points of a specific media asset.

In some embodiments, after obtaining the total number of all of the desired parts (e.g., all of the plot points) of the media asset, and the count of the desired parts that are included in the condensed media asset, the media guidance application may compute the difference between them in order to determine the number of the desired parts that are omitted from the condensed media asset. Based on this difference, the media guidance application may then determine whether the number of plot points that are omitted from the condensed media asset is greater than the maximum amount of plot points that are allowed to be omitted from the condensed media asset. Further, based on this determination, the media guidance application may provide a corresponding alert to the user. For example, the number of plot points that are omitted from the condensed media asset may be three, meaning that three of the plot points are omitted due to the time duration constraint imposed by the user. Moreover, in this example, the maximum amount of plot points that are allowed to be omitted from the condensed media asset may be two. When the media guidance application compares this maximum amount (2) against the number of omitted plot points (3), the media guidance application will determine that the number of plot points that are omitted from the condensed media asset is greater than the maximum amount of plot points that are allowed to be omitted from the condensed media asset. The media guidance application may then alert the user regarding a result of this determination. For instance, the media guidance application may show a descriptive text regarding the determination on a display to a user. Additionally or alternatively, the media guidance application may alert the user by changing the background color of the display to red, and/or changing the color of a time bar that was used to input a desired time duration to red.

The media guidance application may provide a rating that corresponds to the number of the omitted desired parts (e.g., plot points), wherein the rating measures adequacy of the condensed media asset. To determine such a rating, for example, the media guidance application may retrieve one or more threshold values against which the number of omitted plot points is to be compared. In some embodiments, the media guidance application may automatically retrieve a predetermined set of threshold values. Additionally or alternatively, the media guidance application may retrieve a set of threshold values based on user input. In some other embodiments, the media guidance application may retrieve a set of threshold values that may be stored in a database. Such a database may be stored, for example, on a local user device or on a remote device.

To illustrate, a set of threshold values may include, for example, two numerical threshold values. In that case, the media guidance application may determine that the rating is superior if the number of omitted plot points is equal to or less than the first threshold value. The media guidance application may also determine that the rating is average if the number of omitted plot points is between the first threshold value and the second threshold value. Further, the media guidance application may determine that the rating is inferior if the number of omitted plot points is equal to or greater than the second threshold value.

The media guidance application may represent a rating for a condensed media asset using a time bar. For example, by implementing a color scheme on the time bar, the media guidance application may visually represent to the user the rating that corresponds to the number of the omitted plot points. In some embodiments, the media guidance application may implement a three-color scheme for the time bar to represent the rating. For example, the time bar may turn green when the rating is determined to be superior or very satisfactory. The time bar may turn orange when the rating is determined to be average or satisfactory. The time bar may also turn red when the rating is determined to be inferior or unsatisfactory. Additionally or alternatively, the media guidance application may rapidly change the color of the time bar to represent different ratings as the user changes the desired time duration.

Additionally or alternatively, the media guidance application may represent a rating by generating a sound that corresponds to a rating. A sound may offer an additional or alternative way to a visual representation in providing feedback on the condensed media asset. For example, the media guidance application may provide a joyful sound when the rating is excellent. The media guidance application may provide a pleasant sound when the rating is average. The media guidance application may also provide an austere sound when the rating is below average. In some embodiments, the media guidance application may instantaneously provide a sound that corresponds to the rating so that the user can receive real-time feedback.

In some embodiments, a touchscreen device may be used to receive a user selection of a media asset. A touchscreen device may be, for example, a remote control, wireless handheld personal organizer, a smart phone, or a tablet. For example, through the interface of such touchscreen devices, a user can conveniently use finger gestures to select a media asset from a drop-down menu. As another example, a user can type in the title of a desired media asset using an onscreen keyboard. In some other embodiments, a touchscreen device may be used to provide on a display a time bar, which a user can manipulate and adjust. For example, by moving the indicator of the time bar on the screen of a touchscreen device, a user may be able to efficiently and intuitively adjust the desired time. Further, a touchscreen device may provide on the display the representation of the rating via the time bar. The touchscreen device may also provide a sound that corresponds to the rating. In some embodiments, the touchscreen device may also be capable of playing a media asset and/or a condensed media asset.

Methods and systems are also provided herein for a media guidance application that customizes media assets based on one or more content type selection criteria. In particular, the media guidance application may receive a desired time duration for a condensed version of a media asset, and one or more content type selection criteria. For example, a content type selection criterion may identify a type of content that a user desires in a condensed media asset when the user wishes to keep only certain types of scenes of the media asset for the condensed version. Based on the time duration constraint and the content type selection criterion specified by the user, the media guidance application may create a condensed version that preserves a certain type of scenes of a movie to be included while taking into account the time constraint. For example, with the scenes for the condensed version selected, the media guidance application may then identify a portion that corresponds to the content type selection criterion, and include in the condensed version if the portion's play length is within the desired time duration.

In some embodiments, the media guidance application may also alert a user when the play length of the portion that corresponds to the content type selection criterion exceeds the desired time duration. For example, the media guidance application may color the background of the user interface in red when the play length of the portion that corresponds to the content type selection criterion exceeds the desired time duration. On the other hand, if the play length of the portion is equal to or less than the desired time duration, the media guidance may color the background of the user interface in green. This feedback through changing the color of the user interface is one way to intuitively alert the user about the characteristics of the identified portion that corresponds to the content type selection. By providing a user with the ability to pick and choose contents to be included in a condensed media asset, the user may be able to enjoy, for example, a movie in a limited amount of time while not foregoing the desired contents of the full version of the movie. Accordingly, users are more likely to consume a media asset that can be customized in such a way as herein described as opposed to other media assets.

As referred to herein, a "content type selection criterion" (plural form: "content type selection criteria") may be a requirement set by a user to include content of a media asset. A content type selection criterion may require a condensed version of the media asset to include a certain type of content in the condensed version. For example, a content type selection criterion may specify that all scenes that include comedy contents be included in the condensed version of a TV show. A content type selection criterion may also require a condensed version to not drop any content of a certain type. For example, a content type selection criterion may specify that scenes that are part of the plot of a movie must not be dropped. As another example, a content type selection criterion may specify that the parts of a recorded National Football League ("NFL") football game where the home team is on offensive must not be dropped in the condensed version of the recorded game. Additionally or alternatively, a user selection criterion may require a condensed version of a media asset to specifically exclude certain types of contents while including some other types of contents. For example, in some embodiments, a content type selection criterion may specify that the parts of a National Hockey League ("NHL") hockey game where there were instances of players fighting be excluded while including all parts where there were goals scored.

Further, the media guidance application may receive more than one user selection criterion. For example, in customizing a recorded soccer game, while one user selection criterion may require the customized version to not drop any parts of the games where there were shots on goal, another user selection criterion may specify a requirement to exclude the parts of the game where the soccer game was put on hold due to player injuries.

As referred to herein, the term "content" may mean something that may be expressed through some medium and perceived. Content may be substantive information or material that may be perceived by a person. Content may be visual, auditory, or both. Further, content may refer to one or more parts of a media asset. Content may contain images, sounds or both. Content may include one or more segments of a media asset. For example, the content of a movie may include one or more segments of a movie. As another example, the content of an NHL game may refer to all three (3) periods of the game. In some embodiments, content may be text that is displayed on a screen that a user can read. For example, content may be a textual summary of a scene of a movie that is removed from the condensed version of the original media asset. Content may also contain "Cliff's Notes" that may summarize the scene that is being skipped, or may provide a guide on that skipped scene. Further, content may also contain an image that may be representative of the particular skipped scene. In some other embodiments, the media guidance application may receive content from a local device or a remote device. Additionally or alternatively, the media guidance application may generate certain content based on other existing content. For example, the media guidance application may generate a textual summary of a removed scene of a movie based on the metadata associated with that scene.

The media guidance application may receive a user selection of a media asset to be condensed. There may be multiple ways for the media guidance application to receive such a user selection. For example, the media guidance application may provide an existing list from which a user can select a desired media asset. As another example, the media guidance application may provide a text field for a user to input a string of one or more characters for a desired media asset. As a further example, the media guidance application may also provide on-screen selection buttons to receive a user selection of a media asset.

A media asset may include one or more segments. Each segment may be a discrete piece of a particular media asset. For example, a segment may be delimited by a start time and end time, and may thus correspond to a time range within a media asset. In some embodiments, segments of a media asset may be of the same time length. In some other embodiments, segments may be of different lengths. Furthermore, each segment of a media asset may be associated with its corresponding metadata, which may identify the segment.

A segment's metadata may also contain information on the corresponding time range for the associated segment. In some other embodiments, each metadata may include a content type value that indicates a content type of a segment of the media asset. The metadata of a segment may further contain the information of the memory location where that portion is stored on a hard drive of a local user device. The use of metadata may provide one way for the media guidance application to identify one or more segments of the media asset in order to select them. A media asset's segments may be stored in a local user device, and/or stored in an external or remote device or medium. When a media asset is stored in a remote device, the content of the media asset may, for example, physically reside in a remote storage server of a content provider such as a cable operator. The media guidance application may receive each of the segments of a media asset stored on a remote device by streaming or downloading to a local user device.

The media guidance application may receive a time duration for the media asset, where the time duration is less than the play length of the media asset. The time duration may be inputted by a user, and may represent the desired amount of time in which the user wants to view the media asset. Based on the time duration, the media guidance application may condense an original media asset into a condensed version that corresponds to the time duration. In some embodiments, the condensed version may be of the exact same time length as the time duration desired by the user. In some other embodiments, the condensed version may be of a time length that is shorter than the time duration.

The media guidance application may receive one or more content type selection criteria, wherein each content type selection criterion identifies a type of content that the user desires in a condensed media asset. Such a content type selection criterion may provide a user with the ability to choose a portion of the media asset that corresponds to the content type selection criterion. In some embodiments, the media guidance application may identify a group of segments whose content type values of the metadata match the content type selection criterion to be the portion of the media asset that corresponds to the content type selection criterion. Based on a particular content type selection criterion, the media guidance application may determine whether a particular segment of the media asset is to be included in the condensed version. For example, a content type selection criterion may identify a genre of the content that a user desires in a condensed media asset. A genre may be romance, drama, action, comedy, suspense, musical, or horror. In some embodiments, a content type selection criterion may select contents of a media asset in which a certain character, actor or actresses appears. For example, in the context of a TV series, a content type selection criterion may indicate that a user desires to select contents in which her favorite actor appears. In that case, the media guidance application may identify for inclusion into the condensed version all of the segments of an episode of the TV series where the particular character appears. In some other embodiments, a content type selection criterion may identify sport event highlights as the content that a user desires in a condensed media asset.

Further, the media guidance application may identify a portion that corresponds to the content type selection criterion that may impose a requirement to exclude certain types of contents, but include some other types of contents. For example, the selection criterion may specify that, for a recorded soccer game, the parts of the game where there was stoppage due to player injuries should be excluded, and the parts of the game where the soccer ball was in play in the penalty boxes should be included.

Based on one or more content type selection criteria, the media guidance application may identify a portion of the media asset that corresponds to the content type selection criterion. In some embodiments, for each of the plurality of segments, the media guidance application may retrieve corresponding metadata, wherein each metadata includes a content type value that indicates a content type of a segment of the media asset. The content type value of the metadata of a segment may indicate that the segment contains comedy content. By evaluating the content type value of the metadata of each segment of the media asset, the media guidance application may be able to identify those segments whose content type values match the content type selection criterion. Those identified segments may then form the portion of the media asset that corresponds to the content type selection criterion. In some cases, the content type value of the metadata of a segment may be a "NULL" value, which may indicate that the corresponding segment does not include any substantive content. For example, a segment that only contains the credits may have a content type value of the metadata that is a "NULL" value.

To illustrate, the media guidance application may receive a desired time duration of 30 minutes to condense a media asset (e.g., a movie) that is two hours (120 minutes) in play length, and a content type selection criterion for romance content. Further, the movie may be made of twelve (12) segments of ten (10) minutes in duration, and may have a total of three (3) segments that contain romance scenes, which are located at the $30^{th}$ minute, the $60^{th}$ minute, and the $90^{th}$ minute, respectively. In that case, the media guidance application may select these three segments based on the content type values of their metadata that indicate the segments contain romance contents. Thus, the media guidance application may identify these segments as a portion of the media asset that corresponds to the content type selection criterion. As a related example, when a movie has four (4) segments that contain romance scenes, the media guidance application may identify all of the four (4) segments as the portion of the media asset that corresponds to the content type selection criterion for romance content. However, if the desired time duration by the user is only (thirty) 30 minutes, then the portion may not be capable of being included in a condensed media asset of thirty (30) minutes. In that case, the media guidance application may alert the user about this issue through, for example, changing the color of the user interface, a sound, and/or a descriptive text. In some embodiments, the media guidance application may include for inclusion into the condensed media asset only the first three of the four segments that contain romance scenes. In some other embodiments, the media guidance application may select the last three of the four segments that contain romance scenes.

In some embodiments, to identify a portion of the media asset that corresponds to the content type selection criterion, the media guidance application may retrieve time ranges of the media asset from a first database, wherein each of these time ranges corresponds to the content type selection criterion, and may then input each of the time ranges retrieved from the first database into a second database listing all of the segments of the media asset and their corresponding time ranges to determine a set of the segments that match the content type selection criterion. For example, each segment listed in the first database may have a corresponding time range in terms of a start time and an end time of the segment. The start time and the end time of the segment may be defined with respect to the full version of the media asset. Similarly, each segment listed in the second database may also have a corresponding time range in terms of a start time and an end time of the segment. The media guidance application may compare the start time and end time of each segment (corresponding to the content type selection criterion) of the first database against the start time and end time of each segment listed in the second database to determine those segments that match the content type selection criterion. In some embodiments, the media guidance application may retrieve entries of the first or the second database that is stored in a local device. In some other embodiments, the databases may be stored in a remote device.

Once a portion of the media asset that corresponds to the content type selection criterion is identified, the media guidance application may determine the play length of the portion that consists of the identified segments. There are several ways by which the media guidance application may determine this play length of the portion. For example, the media guidance application may sum up the time lengths of the selected segments as specified in their metadata. In some embodiments, the media guidance application may generate a condensed media asset that includes the portion, if the play length of the portion is less than or equal to the desired time duration for the condensed media asset.

In some embodiments, to generate a condensed media asset that includes a portion that corresponds to a content type selection criterion, the media guidance application may create an ensemble of links that may point to the selected segments whose content type values match the content type selection criterion. Such links may, for example, point to the corresponding segments of the full version of the media asset that is stored locally or remotely. In that case, the media guidance application may not need to create, or save into storage, a copy of the selected segments of the condensed media asset. Alternatively, the media guidance application may generate a condensed version by saving a copy of each of the selected segments into storage, which may be local or remote.

In some other embodiments, the media guidance application may assign a rating or score to a condensed media asset. For example, when an identified portion that corresponds to a content type selection criterion is longer than the time duration desired by the user and cannot be entirely included in the condensed media asset, the media guidance application may determine the number of segments matching the content type selection criterion that are included in the condensed media asset, or the number of segments matching the content type selection criterion that are excluded from the condensed media asset due to constraint imposed by the desired time duration. For instance, based on the number of segments matching the content type selection criterion that are excluded from the condensed media asset, the media guidance application may assign a superior grade if the number of excluded segments is less than three (3); a grade of average if the number of excluded segments is three (3); and a grade of inferior if the number of excluded segments is more than three (3).

In some embodiments, the play length of the identified portion that corresponds to the content type selection criterion is less than the desired time duration. In that case, the condensed media asset that contains the identified portion may be of a play length that is the same as the play length of the identified portion.

Alternatively, the condensed media asset that contains the identified portion may be longer than the identified portion as the condensed media asset may contain other additional materials. For example, the condensed media asset may further contain an additional portion of the media asset that does not correspond to the content type selection criterion. In some embodiments, the additional portion included by the condensed media asset may take up the unused time from the desired time duration. In that case, the identified portion that corresponds to the content type selection criterion and the additional portion that does not correspond to the content type selection criterion may form the condensed media asset, and their total length may be equal to the desired time duration.

In some embodiments, to identify an additional portion of the media asset that does not correspond to the content type selection criterion, the media guidance application may retrieve the metadata that corresponds to each of the segments of the full version of the media asset. For example, each metadata may include a content type value that indicates a content type of the associated segment. By evaluating whether the content type value does not correspond to the content type selection criterion, the media guidance application may be able to identify those segments that do not match the content type selection criterion. Such identified segments may then form the additional portion of the media asset that does not correspond to the content type selection criterion.

There may be other ways to identify an additional portion of the media asset that does not correspond to the content type selection criterion. For example, the media guidance application may retrieve time ranges of the media asset from a first database, wherein each of these time ranges does not correspond to the content type selection criterion, and may then input each of the time ranges retrieved from the first database into a second database listing all of the segments of the media asset and their corresponding time ranges to determine a set of the segments that do not match the content type selection criterion. For example, each segment listed in the first database may have a corresponding time range in terms of a start time and an end time of the segment. The start time and the end time of the segment may be defined with respect to the full version of the media asset. Similarly, each segment listed in the second database may also have a corresponding time range in terms of a start time and an end time of the segment. The media guidance application may compare the start time and end time of each segment (not corresponding to the content type selection criterion) of the first database against the start time and end time of each segment listed in the second database to determine those segments that do not match the content type selection criterion. In some embodiments, the media guidance application may retrieve entries of the first or the second database that is stored in a local device. In some other embodiments, the databases may be stored in a remote device.

The condensed media asset may further include supplemental content. In some embodiments, the included supplemental content may describe the subject matter of the condensed media. For example, the included supplemental content may be a textual description of one or more segments of the condensed media asset, and may supplement a viewer of the condensed media asset with detailed information about the one or more segments and/or information on the relationship between one particular segment and other segments. As another example, the included supplemental content may be "Cliff's Notes" on one or more segments of the condensed media asset. In the context of a movie, for example, the "Cliff's Notes" may provide a summary of the segments of the condensed media asset. In some other embodiments, the media guidance application may receive content from a local device or a remote device. Moreover, the media guidance application may generate supplemental content based on other existing content. For example, the media guidance application may generate a textual summary of a segment (e.g. a scene of a movie) based on the metadata associated with that segment.

Additionally or alternatively, supplemental content included in a condensed media asset may describe the subject matter of those segments that are not included in the condensed media asset due to the constraint imposed by the desired time duration. For example, the included supplemental content may also contain "Cliff's Notes" that may summarize each of those segments that are omitted from the condensed media asset. Such supplemental content may provide a useful guide to the user so that she may learn about what is being skipped when viewing the condensed media asset. Further, such supplemental content may also contain an image that may describe those skipped segments.

In some embodiments, the play length of the condensed media asset may correspond to the desired time duration, which may be longer than the play length of the portion corresponding to the content type selection criterion. In that case, the play length of the condensed media asset may accommodate the time length of the supplemental content identified by the media guidance application without necessitating the need to increase the play length of the condensed media asset.

There are several ways to identify supplemental content to be included in a condensed media asset. For example, the media guidance application may receive a supplemental content type selection criterion identifying a type of supplemental content that the user desires in the condensed media asset. Types of supplemental content may include textual description of a segment, a graphical description of a segment, a video clip description of a segment, an audio description of a segment, or "Cliff's Notes" about a segment. The media guidance application may then select supplemental data corresponding to the supplemental content type selection criterion to be the supplemental content to be included in the condensed media asset.

In some further embodiments, the media guidance application may, for example, receive a user selection of a media asset, a time duration for the media asset, and/or a content type selection criterion via a touchscreen device such as a smart phone, a tablet, or both. For example, the media guidance application may also provide, using a touchscreen device, alerts when an identified portion exceeds the desired time duration.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Figure 2:
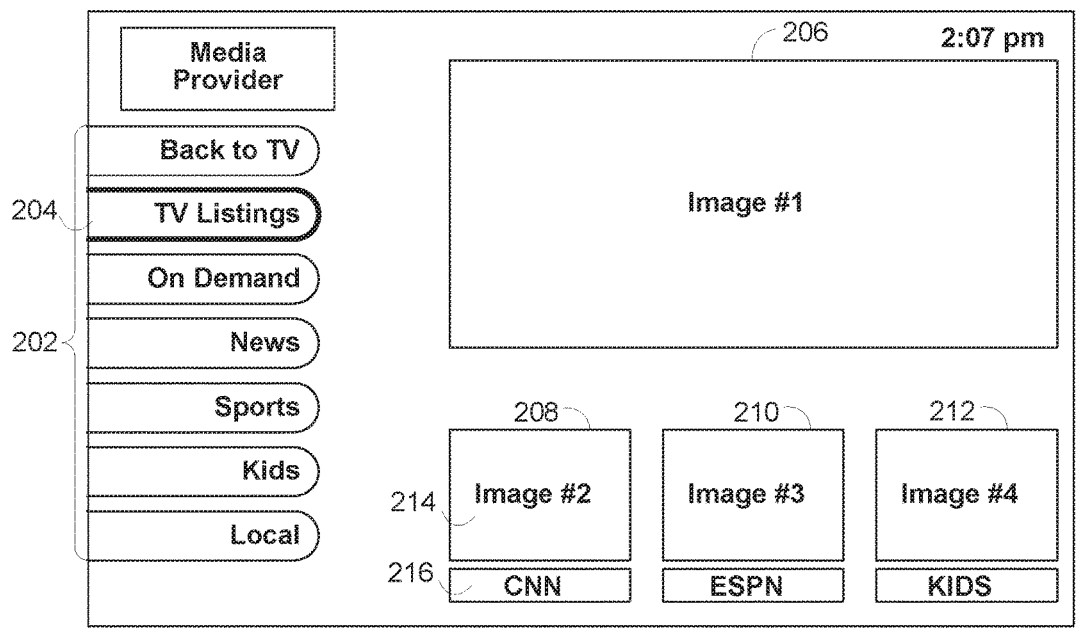
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
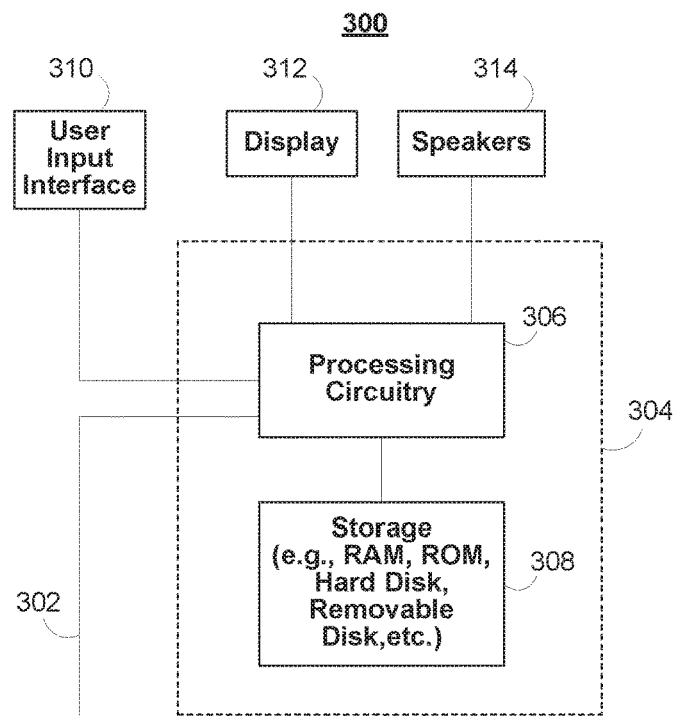
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
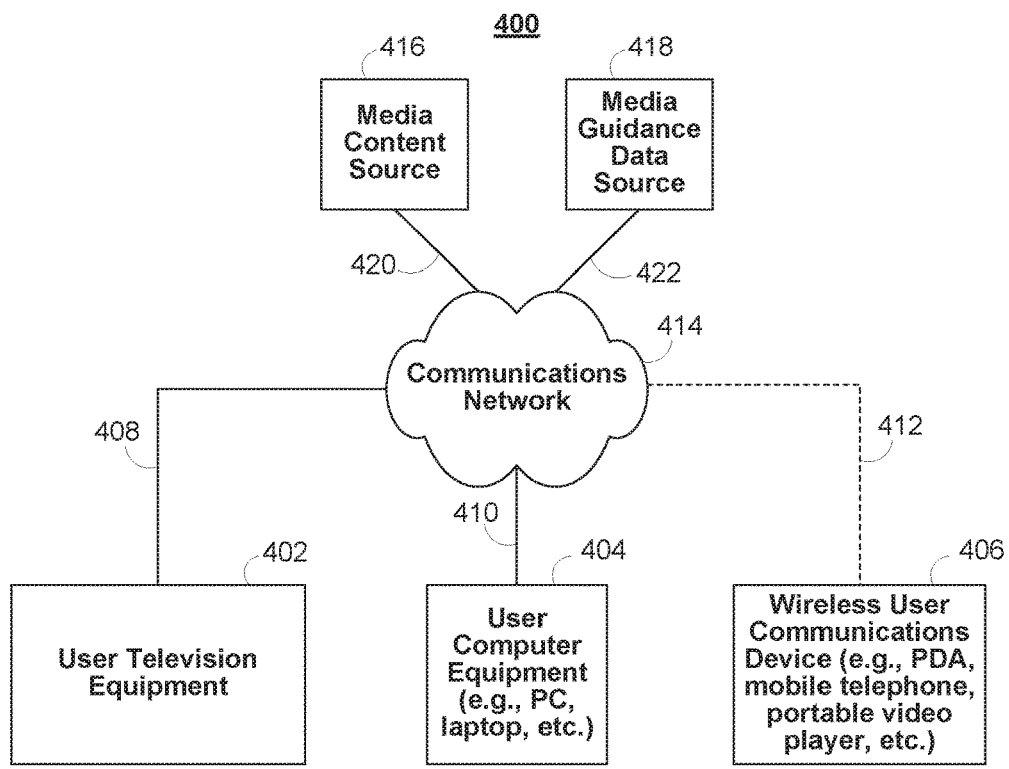
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on a communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

Figure 5:
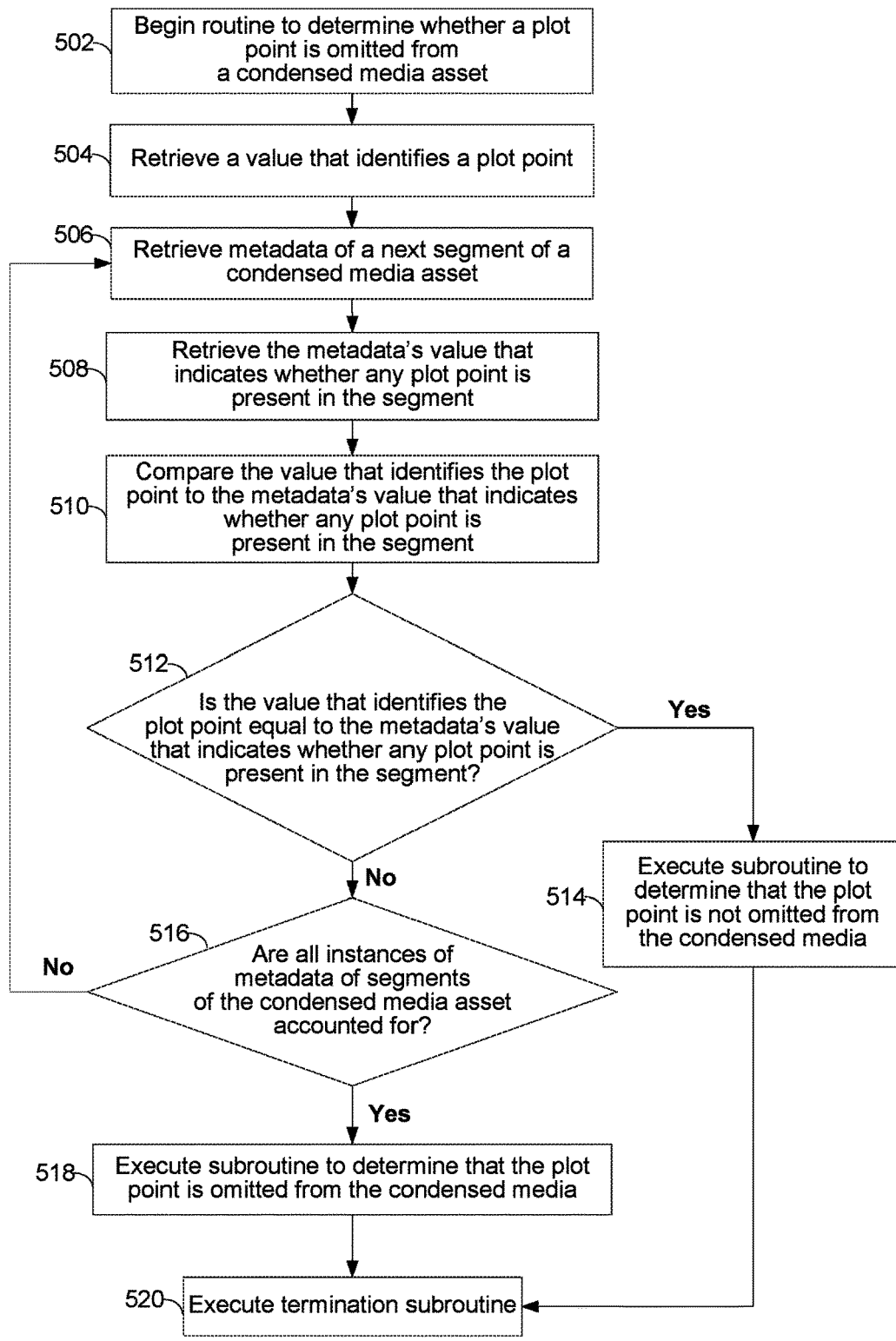
FIG. 5 is a flowchart of an illustrative process for determining whether a plot point is omitted from a condensed media asset in accordance with some embodiments of the disclosure.

FIGS. 5 and 6 present a process for control circuitry (e.g., control circuitry 304) to determine whether a plot point is omitted from a condensed media asset in accordance with some embodiments of the disclosure. In some embodiments, process 500 may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes a process implemented on control circuitry (e.g., control circuitry 304) to determine whether a plot point is omitted from a condensed media asset in accordance with some embodiments of the disclosure.

At step 502, the process to determine whether a plot point is omitted from a condensed media asset begins. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his or her input using a display (e.g., by generating a prompt to be displayed on display 312) prior to running process 500.

At step 504, control circuitry 304 proceeds to retrieve a value that identifies a plot point. In some embodiments, control circuitry 304 may receive a single primitive data structure that represents the value that identifies a plot point. In some embodiments, the value may be stored as part of a larger data structure, and control circuitry 304 may retrieve the value by executing appropriate accessor methods to retrieve the value from the larger data structure.

At step 506, control circuitry 304 proceeds to retrieve the metadata of a next segment of a condensed media asset. In some embodiments, control circuitry 304 may receive a single primitive data structure that represents the metadata of the segment. In some embodiments the metadata may be stored as part of a larger data structure, and control circuitry 304 may retrieve the metadata by executing appropriate accessor methods to retrieve the metadata from the larger data structure.

At step 508, control circuitry 304 proceeds to retrieve the metadata's value that indicates whether any plot point is present in the segment. In some embodiments, control circuitry 304 may receive a single primitive data structure that represents the value that indicates whether any plot point is present in the segment. In some embodiments, the value may be stored as part of a larger data structure, and control circuitry 304 may retrieve the value by executing appropriate accessor methods to retrieve the value from the larger data structure.

At step 510, control circuitry 304 proceeds to compare the value that identifies the plot point to the metadata's value that indicates whether any plot point is present in the segment. Control circuitry 304 may call a comparison function (e.g., for object-to-object comparison) to compare the value that identifies the plot point of interest to the metadata's value that indicates whether any plot point is present in the segment.

At step 512, control circuitry 304 evaluates whether the value that identifies the plot point is equal to the metadata's value that indicates whether any plot point is present in the segment. For example, control circuitry 304 may call a function to perform a comparison. If the function returns true (e.g., the value that identifies the plot point is equal to the metadata's value that indicates whether any plot point is present in the segment), control circuitry 304 proceeds to step 514; if the condition is not satisfied, process 500 proceeds to step 516 instead.

At step 516, control circuitry 304 checks if all instances of metadata of segments of the condensed media asset are accounted for. If all such instances have been evaluated, control circuitry 304 proceeds to step 518. For example, control circuitry 304 may call a function to see if there is a next metadata of a segment. If the function returns true (e.g., there is still at least one instance that needs to be processed), control circuitry 304 proceeds to step 506; otherwise, process 500 proceeds to step 518 instead.

At step 514, control circuitry 304 executes a subroutine to determine that the plot point is not omitted from the condensed media. At step 520, control circuitry 304 runs a termination subroutine after process 500 has performed its function.

It is contemplated that the descriptions of FIG. 5 may be used with any other embodiment of this invention. In addition, the descriptions described in relation to process 500 may be done in alternative orders or in parallel to further the purposes of this invention. As an example, in some embodiments, several instances of metadata of segments may be evaluated in parallel, using multiple logical processor threads, or process 500 may be enhanced by incorporating branch prediction. Furthermore, it should be noted that process 500 may be implemented on a combination of appropriately configured software and hardware, and that any of the devices or equipment discussed in relation to FIGS. 3-4 could be used to implement one or more portions of the process.

The pseudocode in FIG. 6 describes a process to determine whether a plot point is omitted from a condensed media asset in accordance with some embodiments of the disclosure. It will be evident to one skilled in the art that the process described by the pseudocode in FIG. 6 may be implemented in any number of programming languages and a variety of different hardware, and that the style and format should not be construed as limiting, but rather as a general template of the steps and procedures that would be consistent with code used to implement some embodiments of this invention.

At line 601, control circuitry 304 runs a subroutine to initialize variables and prepare to determine whether a plot point is omitted from a condensed media asset. For example, in some embodiments control circuitry 304 may copy instructions from a non-transitory storage medium (e.g., storage device 308) into RAM or into the cache for processing circuitry 306 during the initialization stage.

At line 605, control circuitry 304 retrieves a value that identifies a plot point. In some embodiments, the retrieved value may be stored in memory. The control circuitry 304 may convert the value into a format that it can later use for comparison.

At line 606, control circuitry 304 retrieves instances of metadata of segments of a condensed media asset. In some embodiments, these instances may be stored in memory. For example, an instance of metadata that may have several values may be stored in memory in such a way that each value is organized in memory in a way that control circuitry 304 can readily identify.

At line 607, control circuitry 304 iterates through the various instances of the metadata of the segments of the condensed media asset. If only a single instance is available, then the loop will only execute once. This loop may be implemented in multiple fashions depending on the choice of hardware and software language used to implement the process of FIG. 6; for example, this may be implemented as part of a "for" or "while" loop.

At line 608, control circuitry 304 retrieves the segment's metadata's value that indicates whether any plot point is present in that segment. In some embodiments, the retrieved value may be stored in memory. The control circuitry 304 may convert the value into a format that it can later use for comparison.

At line 609, control circuitry 304 stores the value of the retrieved metadata's value that indicates whether any plot point is present into a temporary variable "A." In some embodiments, this value may be stored as part of a larger data structure or class, and may be obtained through accessor methods. In some embodiments, the content of the instance of the metadata may be partitioned into various values, which may then be converted from their respective original formats into a numeric data type by means of an appropriate hashing algorithm.

At line 610, control circuitry 304 stores the retrieved value that identifies the plot point into a temporary variable "B." In some embodiments, such content may be stored as part of a larger data structure or class, and may be obtained through appropriate accessor methods.

At line 611, control circuitry 304 evaluates whether the retrieved metadata's value that indicates whether any plot point is present in the segment is equal to the retrieved value that identifies the plot point. This is achieved by, for example, comparing these values. If the condition being evaluated at line 611 is satisfied (i.e., A is equal to B), then, at line 612, control circuitry 304 will execute a subroutine to determine that the plot point is not omitted from the condensed media, and then cause the process to exit the loop and proceed to line 617. If the condition being evaluated at line 611 is not satisfied, the process will loop back to line 607 where control circuitry 304 will retrieve the next instance of the metadata of a segment of the condensed media asset.

At line 615, control circuitry 304 executes a subroutine to determine that the plot point is omitted from the condensed media. At line 617, control circuitry 304 runs a termination subroutine after process 600 has performed its function.

It will be evident to one skilled in the art that process 600 described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, the conditional statement may be replaced with a case-switch. In some embodiments, rather than iterating over all instances of metadata of segments of a condensed media asset at step 607, in some embodiments, the code may be rewritten so control circuitry 304 is instructed to evaluate multiple instances of metadata of segments of a condensed media asset simultaneously on a plurality of processors or processor threads, lowering the number of iterations needed and potentially speeding up computation time.

Figure 7:
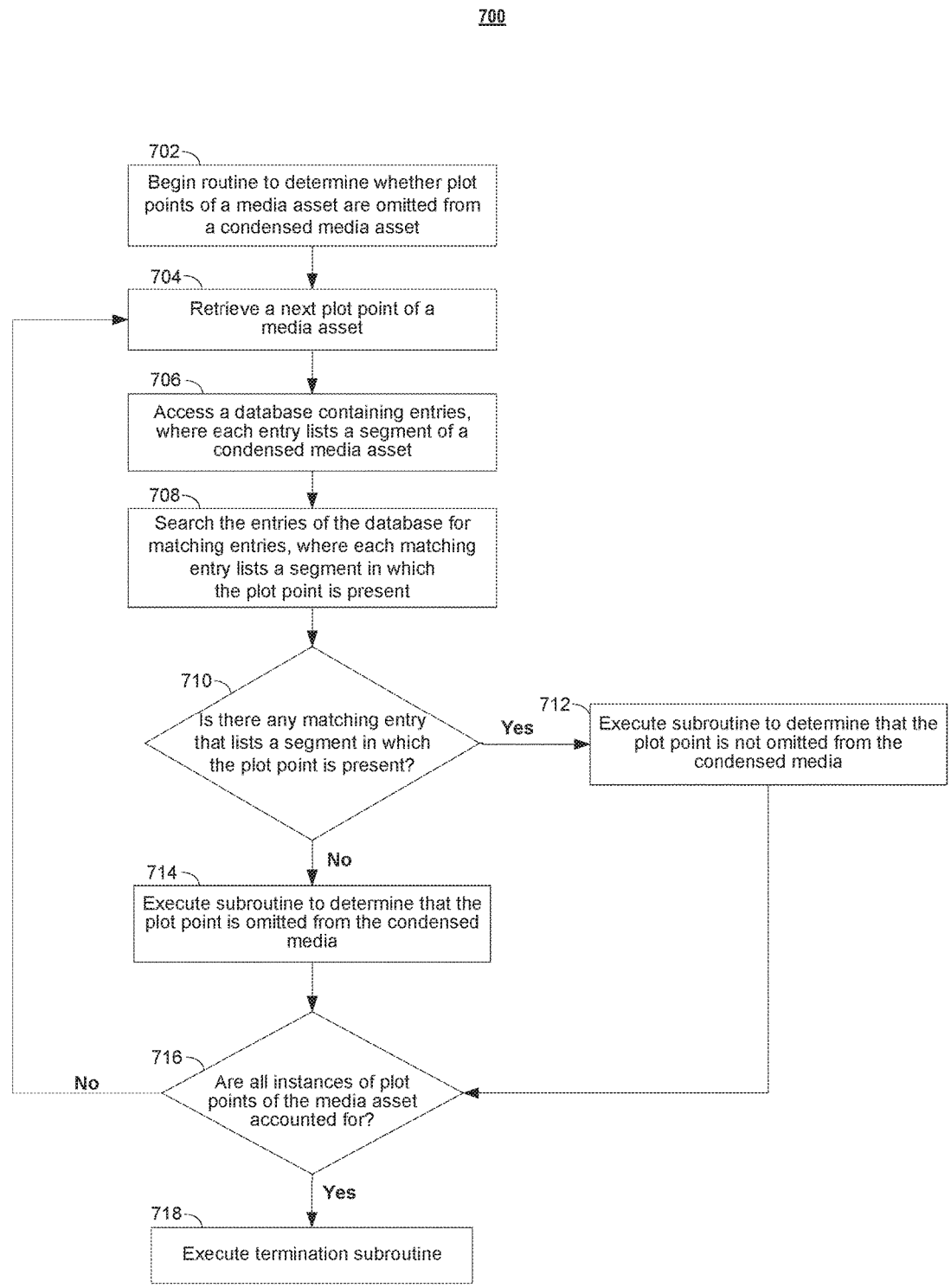
FIG. 7 is a flowchart of an illustrative process for determining whether plot points of a media asset are omitted from a condensed media asset in accordance with some embodiments of the disclosure.

FIGS. 7 and 8 present processes implemented on control circuitry (e.g., control circuitry 304) to determine whether plot points of a media asset are omitted from a condensed media asset in accordance with some embodiments of the disclosure. Similar to the process described by FIGS. 5 and 6, in some embodiments this process may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process implemented on control circuitry (e.g., control circuitry 304) to determine whether plot points of a media asset are omitted from a condensed media asset in accordance with some embodiments of the disclosure.

At step 702, the process to determine whether plot points of a media asset are omitted from a condensed media asset begins. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his or her input using a display (e.g., by generating a prompt to be displayed on display 312) prior to running process 700.

At step 704, control circuitry 304 proceeds to retrieve a next plot point of a media asset. In some embodiments control circuitry 304 may retrieve a single primitive data structure that represents a value that identifies the plot point of interest. In some embodiments control circuitry 304 may retrieve the value from a larger class or data structure.

At step 706, control circuitry 304 accesses a database containing entries, where each entry lists a segment of a condensed media asset. In some embodiments, this database may be stored locally (e.g., on storage device 308) prior to beginning process 700. In some embodiments the database may also be accessed by using communications circuitry to transmit information across a communications network (e.g., communications network 414) to a database implemented on a remote storage device (e.g., media guidance data source 418).

At step 708, control circuitry 304 searches the entries of the database for matching entries, where each matching entry lists a segment in which the plot point is present. In some embodiments, this may be done by comparing each segment's corresponding value indicating whether any plot point is present in the segment with an identification number of the plot point of interest. In some embodiments, control circuitry 304 may submit a general query to the database for entries listing segments in which the plot point of interest is present. In some embodiments the database may implement a junction table that in turn cross-references entries from other databases. Although control circuitry 304 is described as interacting with a single database for purposes of clarity, it is understood that the process of FIG. 7 may be implemented using multiple independent or cross-referenced databases.

At step 710, control circuitry 304 determines if there is any matching entry that lists a segment in which the plot point is present. In some embodiments, control circuitry 304 may receive a signal from the database indicating that there are no matching entries. In some embodiments control circuitry 304 may instead receive a list of indices or data structures with a NULL or dummy value. If control circuitry 304 identifies that there is at least one database entry listing a segment of a condensed media asset where the plot point of interest is present, then process 700 proceeds to step 712; otherwise process 700 proceeds to step 714.

At step 712, control circuitry 304 executes a subroutine to determine that the plot point is not omitted from the condensed media. Afterwards, process 700 proceeds to step 716 where control circuitry 304 determines if all instances of plot points of the media asset have been accounted for, and if further iterations are needed. If further iterations are needed, process 700 will loop back to step 704, where control circuitry 304 will retrieve a next plot point of a media asset. If no further iterations are needed process 700 will proceed to step 718.

At step 718, control circuitry 304 runs a termination subroutine after process 700 has performed its function.

It is contemplated that the descriptions of FIG. 7 may be used with any other embodiment of this invention. In addition, the descriptions described in relation to process 700 of FIG. 7 may be done in alternative orders or in parallel to further the purposes of this invention. For example, control circuitry 304 may submit multiple queries to the database in parallel, or it may submit multiple queries to a plurality of similar databases in order to reduce lag and speed the execution of process 700. Furthermore, it should be noted that the process of FIG. 7 may be implemented on a combination of appropriately configured software and hardware, and that any of the devices or equipment discussed in relation to FIGS. 3-4 could be used to implement one or more portions of process 700.

The pseudocode in FIG. 8 describes a process to determine whether plot points of a media asset are omitted from a condensed media asset in accordance with some embodiments of the disclosure. It will be evident to one skilled in the art that process 800 described by the pseudocode in FIG. 8 may be implemented in any number of programming languages and a variety of different hardware, and that the style and format should not be construed as limiting, but rather a general template of the steps and procedures that would be consistent with code used to implement some embodiments of this invention.

At line 801, control circuitry 304 runs a subroutine to initialize variables and prepare to determine whether plot points of a media asset are omitted from a condensed media asset. For example, in some embodiments control circuitry 304 may copy instructions from non-transitory storage medium (e.g., storage device 308) into RAM or into the cache for processing circuitry 306 during the initialization stage.

At line 805, control circuitry 304 receives instances of plot points of a media asset. In some embodiments these instances may be retrieved from memory.

At line 806, control circuitry 304 iterates through the various instances of a plot point of the media asset. If only a single instance is available, the loop will only execute once. This loop may be implemented in multiple fashions depending on the choice of hardware and software language used to implement the process of FIG. 8; for example, this may be implemented as part of a "for" or "while" loop, in some programming languages. In some embodiments, it may be convenient to store the instances of a plot point of the media asset in a single class or encapsulated data structure that will perform the loop as part of an internal method.

At line 807, control circuitry 304 queries a database containing entries, where each entry lists a segment of a condensed media asset, for matching entries, where each matching entry lists a segment in which the plot point is present. In some embodiments, each entry may also list a corresponding value indicating whether any plot point is present in the segment for each listed segment. Depending on how the database is implemented and how each entry is stored, an intermittent step may be required to convert each corresponding value indicating whether any plot point is present in the segment for each listed segment into a form consistent with the database. For example, each corresponding value indicating whether any plot point is present in the segment for each listed segment may be encoded into a string or an integer using an appropriate hashing algorithm prior to being transmitted to the database by control circuitry 304 as part of a query. In some embodiments, each corresponding value indicating whether any plot point is present in the segment for each listed segment may be encoded as a primitive data structure, and control circuitry 304 may submit the identification number of the plot point of interest as a query to the database directly. After querying the database, control circuitry 304 may receive a set of database entries matching the plot point of interest—entries containing segments in which the plot point is present. In some embodiments, control circuitry 304 may receive these entries in the form of a data-structure, a set of indices of the database, or a set of indices of another cross-referenced database.

At line 808, control circuitry 304 will determine if there is a database entry containing a segment where the plot point of interest is present. In some embodiments, control circuitry 304 may determine this by checking if the database returned an empty data structure or a NULL value in response to the query in line 807. If there is at least one matching database entry, the process proceeds to line 809. But, if there is no matching database entry, the process proceeds to line 811.

At line 809, control circuitry 304 executes a subroutine to determine that the plot point is not omitted from the condensed media. At line 811, control circuitry 304 executes a subroutine to determine that the plot point is omitted from the condensed media.

At line 813, control circuitry 304 executes a termination subroutine after the process has performed its function and all instances of the plot points of the media asset have been processed and checked against the database. For example, in some embodiments control circuitry 304 may destruct variables, perform garbage collection, free memory or clear the cache of processing circuitry 306.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of plot points of the media asset and submit multiple database queries simultaneously using a plurality of processors or processor threads. It is also understood that although we may describe control circuitry 304 interacting with a single database, this is only a single embodiment described for illustrative purposes, and the process of FIG. 8 may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 9:
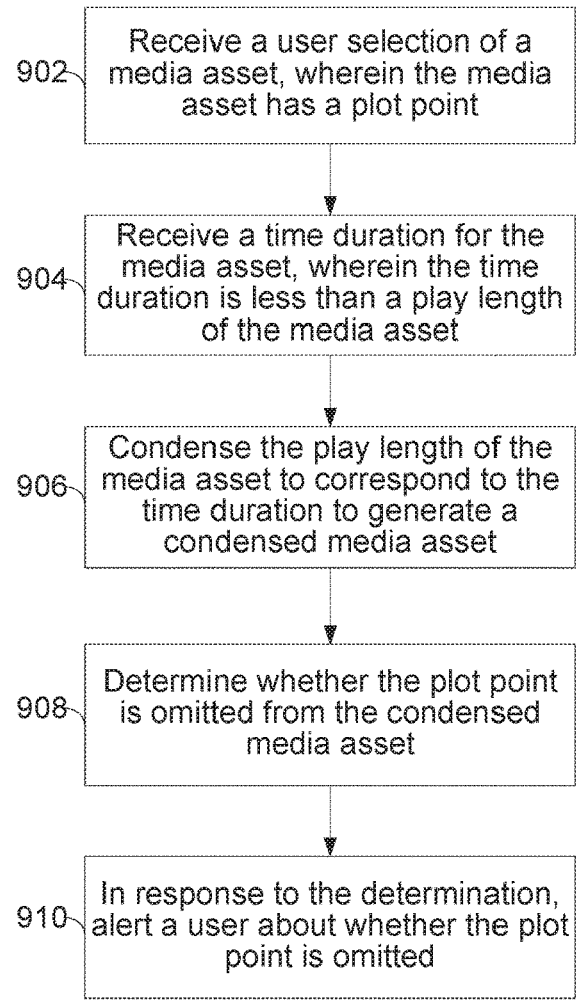
FIG. 9 is a flowchart of an illustrative process for alerting a user about whether a plot point is omitted in accordance with some embodiments of the disclosure.

FIG. 9 is a flowchart of an illustrative process for alerting a user about whether the plot point is omitted in accordance with some embodiments of the disclosure. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to alert a user about whether the plot point is omitted. In addition, one or more steps of process 900 may be incorporated into or combined with one or more steps of any other process or embodiment (e.g., FIGS. 5-8).

At step 902, the media guidance application proceeds to retrieve (e.g., via control circuitry 304 (FIG. 3)) a user selection of a media asset, wherein the media asset has a plot point. In some embodiments, control circuitry 304 may receive a single primitive data structure that represents the value of the user selection of a media asset. In some embodiments, the received user selection may be stored as part of a larger data structure, and control circuitry 304 may later retrieve the value by executing appropriate accessor methods to retrieve the value from the larger data structure. In some other embodiments, the media guidance application may receive a user selection of a media asset in the form of a string of text that represents the title of the media asset. The control circuitry 304 may convert this string into a format that it can later use to retrieve the content of the media asset from, for example, a database of media assets. Such a database may be located locally or remotely.

At step 904, the media guidance application retrieves (e.g., via control circuitry 304 (FIG. 3)) a time duration to condense a media asset where the time duration is less than a play length of the full version of the media asset. In some embodiments, control circuitry 304 may receive a single primitive data structure that represents the value of the time duration. In some embodiments, the value may be stored as part of a larger data structure, and control circuitry 304 may retrieve the value by executing appropriate accessor methods to retrieve the value from the larger data structure. In some other embodiments, control circuitry 304 may convert the received time duration, which may be in an hour-minute format, into a format that control circuitry 304 may later use for subsequence operations.

At step 906, control circuitry 304 proceeds to condense the play length of the media asset to correspond to the time duration to generate a condensed media asset. In some embodiments, control circuitry 304 may select one or more segments of the media asset that match a certain condition. For example, control circuitry 304 may select one or more segments of the media asset that contain plot points. Once the segments are selected, control circuitry 304 may then assemble them into a condensed version of the media asset. In some embodiments, the length of the condensed version may be the same as the time duration. In some other embodiments, the length of the condensed version may be shorter than the time duration.

At step 908, control circuitry 304 proceeds to determine whether the plot point is omitted from the condensed media asset. In some embodiments, control circuitry 304 may evaluate whether each of the segments of the condensed media contains the plot point of interest. For example, control circuitry 304 may determine whether a particular segment contains a plot point by accessing and evaluating its corresponding metadata that indicates whether any plot point is present in a segment. For example, once control circuitry 304 detects that at least one of the segments of the condensed media asset contains the plot point of interest, then the control circuitry 304 will determine that the plot point is not omitted from the condensed media asset.

At step 910, control circuitry 304 proceeds to alert a user about whether the plot point is omitted from the condensed media asset. Control circuitry 304 may, for example, alert the user by providing a textual description that the plot point is omitted after determining that none of the segments of the condensed contains the plot point. Control circuitry 304 may also, for example, alert the user by providing a sound that indicates that the plot point is omitted.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
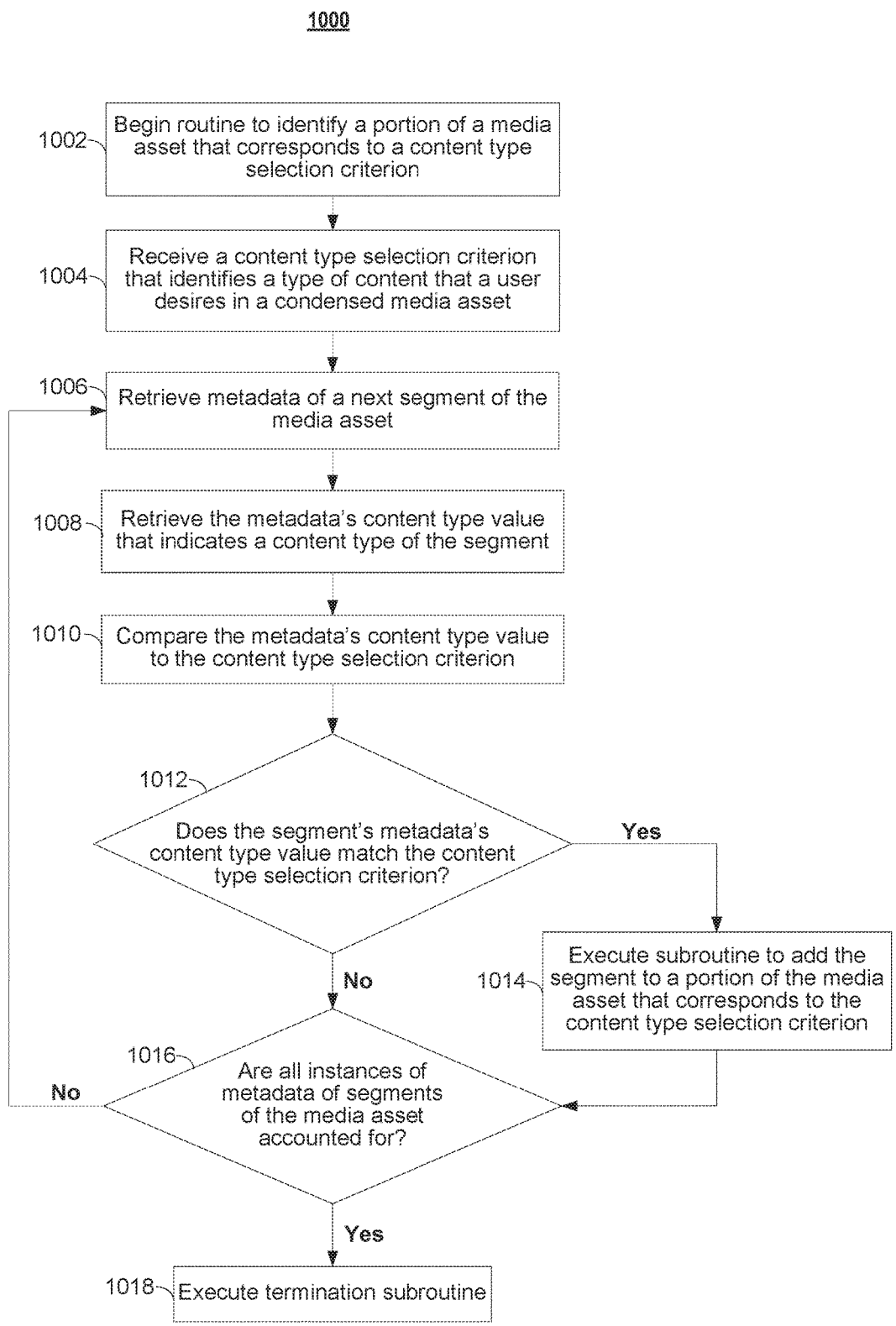
FIG. 10 is a flowchart of an illustrative process for identifying a portion of a media asset that corresponds to a content type selection criterion in accordance with some embodiments of the disclosure.

FIGS. 10 and 11 present processes for control circuitry (e.g., control circuitry 304) to identify a portion of a media asset that corresponds to a content type selection criterion in accordance with some embodiments of the disclosure. In some embodiments this algorithm may be encoded onto a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 10 describes a process implemented on control circuitry (e.g., control circuitry 304) to identify a portion of a media asset that corresponds to a content type selection criterion in accordance with some embodiments of the disclosure.

At step 1002, the process to identify a portion of a media asset that corresponds to a content type selection criterion begins. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his/her input using a display (e.g., by generating a prompt to be displayed on display 312) prior to running the algorithm.

At step 1004, control circuitry 304 proceeds to receive a content type selection criterion that identifies a type of content that a user desires in a condensed media asset. In some embodiments control circuitry 304 may receive a single primitive data structure that represents the value of the selection criterion. In some embodiments the value may be stored as part of a larger data structure, and control circuitry 304 may retrieve the value by executing appropriate accessor methods to retrieve the value from the larger data structure.

At step 1006, control circuitry 304 proceeds to retrieve metadata of a next segment of the condensed media asset. In some embodiments, control circuitry 304 may receive a single primitive data structure that represents the metadata of the segment. In some embodiments the metadata may be stored as part of a larger data structure, and control circuitry 304 may retrieve the metadata by executing appropriate accessor methods to retrieve the metadata from the larger data structure.

At step 1008, control circuitry 304 proceeds to retrieve the segment's metadata's content type value that indicates a content type of the segment. In some embodiments, control circuitry 304 may receive a single primitive data structure that represents the content type value that indicates a content type of the segment. In some embodiments, the value may be stored as part of a larger data structure, and control circuitry 304 may retrieve the value by executing appropriate accessor methods to retrieve the value from the larger data structure.

At step 1010, control circuitry 304 proceeds to compare the metadata's content type value to the content type selection criterion. Control circuitry 304 may call a comparison function (e.g., for object-to object-comparison) to compare the content type value to the content type selection criterion.

At step 1012, control circuitry 304 evaluates whether the segment's metadata's content type value matches the content type selection criterion. For example, control circuitry 304 may call a function to perform a comparison. If the function returns true (e.g., the metadata's content type value matches the content type selection criterion), then control circuitry 304 proceeds to step 1014; if the condition is not satisfied, process 100 proceeds to step 1016 instead.

At step 1014, control circuitry 304 executes a subroutine to add the segment whose content type value matches the content type selection criterion to a portion of the media asset that corresponds to the content type selection criterion.

At step 1016, control circuitry 304 checks if all instances of metadata of segments of the media asset are accounted for. If all such instances have been evaluated, then control circuitry 304 proceeds to step 1018. For example, control circuitry 304 may call a function to see if there is a next metadata of a segment. If the function returns true (e.g., there is still at least one instance that needs to be processed), control circuitry 304 proceeds to step 1006; otherwise, process 1000 proceeds to step 1018 instead. At step 1018, control circuitry 304 runs a termination subroutine after process 1000 has performed its function.

It is contemplated that the descriptions of FIG. 10 may be used with any other embodiment of this invention. In addition, the descriptions described in relation to process 1000 may be done in alternative orders or in parallel to further the purposes of this invention. As an example, in some embodiments, several instances of metadata of segments may be evaluated in parallel, using multiple logical processor threads, or process 1000 may be enhanced by incorporating branch prediction. Furthermore, it should be noted that process 1000 may be implemented on a combination of appropriately configured software and hardware, and that any of the devices or equipment discussed in relation to FIGS. 3-4 could be used to implement one or more portions of the process.

The pseudocode in FIG. 11 describes a process to identify a portion of the media asset that corresponds to a content type selection criterion in accordance with some embodiments of the disclosure. It will be evident to one skilled in the art that the process described by the pseudocode in FIG. 11 may be implemented in any number of programming languages and a variety of different hardware, and that the style and format should not be construed as limiting, but rather as a general template of the steps and procedures that would be consistent with code used to implement some embodiments of this invention.

At line 1101, control circuitry 304 runs a subroutine to initialize variables and prepares to identify a portion of the media asset that corresponds to a content type selection criterion. For example, in some embodiments control circuitry 304 may copy instructions from a non-transitory storage medium (e.g., storage device 308) into RAM or into the cache for processing circuitry 306 during the initialization stage.

At line 1105, control circuitry 304 receives a content type selection criterion that identifies a type of content that a user desires in a condensed media asset. The control circuitry 304 may convert the content type selection criterion into a format that it can later use for comparison.

At line 1106, control circuitry 304 retrieves instances of metadata of segments of a media asset. In some embodiments, these instances may be stored in memory. For example, an instance of metadata that may have several values may be stored in memory in such a way that each value is organized in memory in a way that control circuitry 304 can readily identify.

At line 1107, control circuitry 304 iterates through the various instances of the metadata of the segments of the condensed media asset. If only a single instance is available, then the loop will only execute once. This loop may be implemented in multiple fashions depending on the choice of hardware and software language used to implement the process of FIG. 6; for example, this may be implemented as part of a "for" or "while" loop.

At line 1108, control circuitry 304 retrieves the metadata's content type value that indicates a content type of the segment. In some embodiments, the retrieved value may be stored in memory. The control circuitry 304 may convert the value into a format that it can later use for comparison.

At line 1109, control circuitry 304 stores the value of the retrieved metadata's content type value into a temporary variable "A." In some embodiments, this value may be stored as part of a larger data structure or class, and may be obtained through accessor methods. In some embodiments, the content of the instance of the metadata may be partitioned into various values, which may then be converted from their respective original format into a numeric data type by means of an appropriate hashing algorithm.

At line 1110, control circuitry 304 stores the value of the content type selection criterion into a temporary variable "B." In some embodiments, such content may be stored as part of a larger data structure or class, and may be obtained through appropriate accessor methods.

At line 1111, control circuitry 304 evaluates whether the segment's metadata's content type value is equal to the value of the content type selection criterion. This is achieved by, for example, comparing these values. If the condition being evaluated at line 1111 is satisfied (i.e., A is equal to B), then, at line 1112, control circuitry 304 will execute a subroutine to add the segment to a portion of the media asset that corresponds to the content type selection criterion, and then cause the process to loop back to line 1107 where control circuitry 304 will retrieve the next instance of the metadata of a segment of the condensed media asset. If the condition being evaluated at line 1111 is not satisfied, the process will directly loop back to line 1107, where control circuitry 304 will retrieve the next instance of the metadata of a segment of the condensed media asset.

At line 1114, control circuitry 304 runs a termination subroutine after process 1100 has performed its function.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, the conditional statement may be replaced with a case-switch. In some embodiments, rather than iterating over all instances of metadata of segments of a condensed media asset at step 1006 in some embodiments, the code may be rewritten so control circuitry 304 is instructed to evaluate multiple instances of metadata of segments of a condensed media asset simultaneously on a plurality of processors or processor threads, lowering the number of iterations needed and potentially speeding up computation time.

Figure 12:
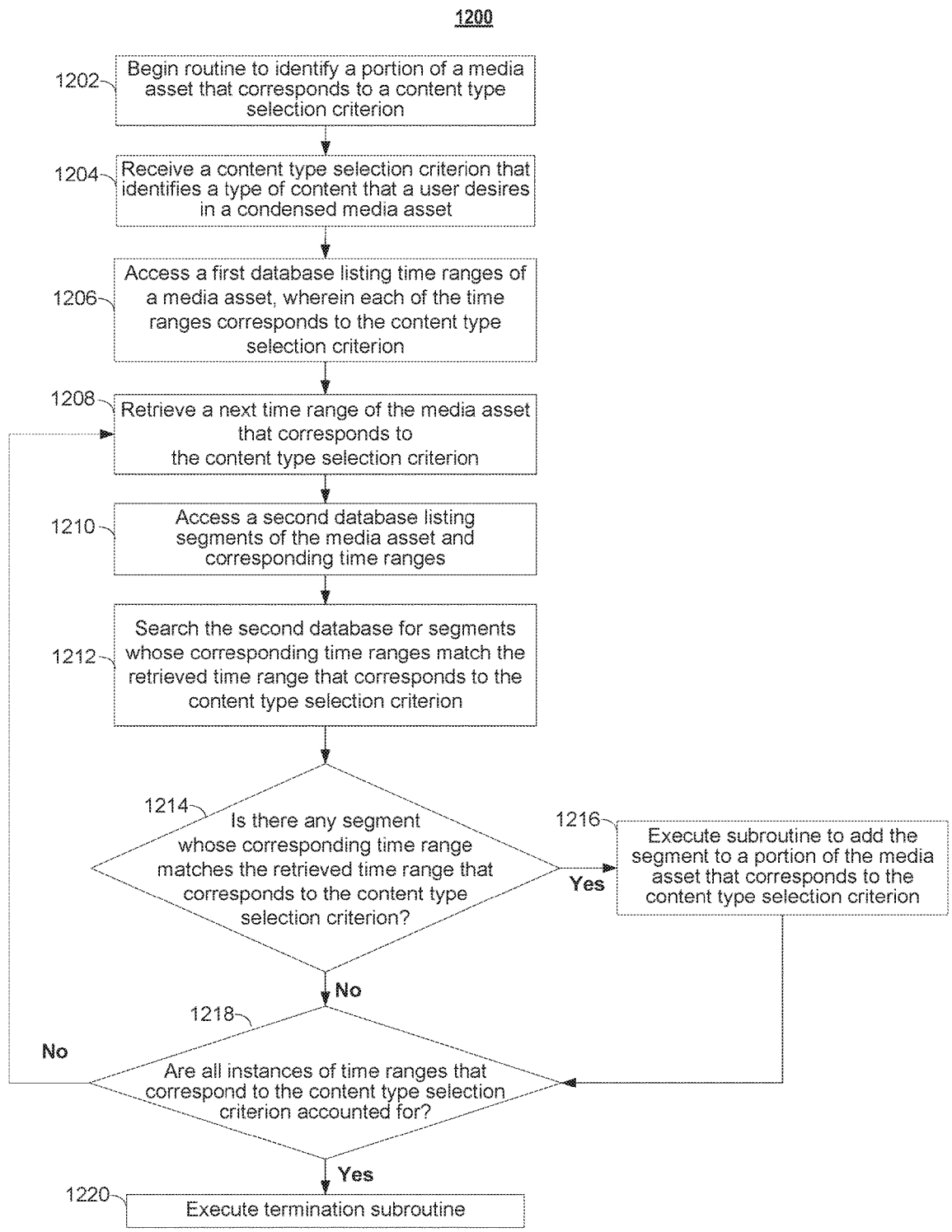
FIG. 12 is a flowchart of an illustrative process for identifying a portion of a media asset that corresponds to a content type selection criterion in accordance with some embodiments of the disclosure.

FIGS. 12 and 13 present processes implemented on control circuitry (e.g., control circuitry 304) to determine to identify a portion of a media asset that corresponds to a content type selection criterion. Similar to the process described by FIGS. 10 and 11, in some embodiments this process may be encoded onto non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 12 describes a process implemented on control circuitry (e.g., control circuitry 304) to identify a portion of a media asset that corresponds to a content type selection criterion in accordance with some embodiments of the disclosure.

At step 1202, the process to identify a portion of a media asset that corresponds to a content type selection criterion begins. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm his or her input using a display (e.g., by generating a prompt to be displayed on display 312) prior to running process 700.

At step 1204, control circuitry 304 receives a content type selection criterion that identifies a type of content that a user desires in a condensed media asset. The control circuitry 304 may convert the content type selection criterion into a format that it can later use for comparison.

At step 1206, control circuitry 304 accesses a first database listing time ranges of a media asset, wherein each of the time ranges corresponds to the content type selection criterion. In some embodiments, this database may be stored locally (e.g., on storage device 308) prior to beginning process 1200. In some embodiments the database may also be accessed by using communications circuitry to transmit information across a communications network (e.g., communications network 414) to a database implemented on a remote storage device (e.g., media guidance data source 418).

At step 1208, control circuitry 304 proceeds to retrieve a next time range of the media asset that corresponds to the content type selection criterion. In some embodiments, control circuitry 304 may retrieve a single primitive data structure that represents a value that corresponds to the content type selection criterion. In some embodiments control circuitry 304 may retrieve the value from a larger class or data structure.

At step 1210, control circuitry 304 accesses a second database listing segments of the media asset and corresponding time ranges. In some embodiments, this database may be stored locally (e.g., on storage device 308) prior to beginning process 1200. In some embodiments the database may also be accessed by using communications circuitry to transmit information across a communications network (e.g., communications network 414) to a database implemented on a remote storage device (e.g., media guidance data source 418).

At step 1212, control circuitry 304 searches the second database for segments whose corresponding time ranges match the retrieved time range that corresponds to the content type selection criterion. In some embodiments, control circuitry 304 may submit a general query to the second database for entries listing segments whose corresponding time ranges match the retrieved time range that corresponds to the content type selection criterion. In some embodiments the database may implement a junction table that in turn cross-references entries from other databases.

At step 1214, control circuitry 304 determines if there is any segment whose corresponding time range matches the retrieved time range that corresponds to the content type selection criterion. In some embodiments, control circuitry 304 may receive a signal from the database indicating that there are no matching segments. In some embodiments control circuitry 304 may instead receive a list of indices or data structures with a NULL or dummy value. If control circuitry 304 identifies that there is at least one segment whose corresponding time range matches the retrieved time range that corresponds to the content type selection criterion, then process 1214 proceeds to step 1216; otherwise process 700 proceeds to step 718.

At step 1216, control circuitry 304 executes a subroutine to add the matching segment to a portion of the media asset that corresponds to the content type selection criterion. Afterwards, process 1200 proceeds to step 1218 where control circuitry 304 determines if all instances of time ranges that correspond to the content type selection criterion are accounted for, and if further iterations are needed. If further iterations are needed process 1200 will loop back to step 1208 where control circuitry 304 will retrieve a next time range of the media asset that corresponds to the content type selection criterion. If no further iterations are needed process 1200 will proceed to step 1220.

At step 1220, control circuitry 304 runs a termination subroutine after process 1200 has performed its function.

It is contemplated that the descriptions of FIG. 12 may be used with any other embodiment of this invention. In addition, the descriptions described in relation to process 1200 of FIG. 12 may be done in alternative orders or in parallel to further the purposes of this invention. For example, control circuitry 304 may submit multiple queries to the database in parallel, or it may submit multiple queries to a plurality of similar databases in order to reduce lag and speed the execution of process 1200. Furthermore, it should be noted that the process of FIG. 7 may be implemented on a combination of appropriately configured software and hardware, and that any of the devices or equipment discussed in relation to FIGS. 3-4 could be used to implement one or more portions of process 700.

The pseudocode in FIG. 13 describes a process to identify a portion of a media asset that corresponds to a content type selection criterion in accordance with some embodiments of the disclosure. It will be evident to one skilled in the art that process 1300 described by the pseudocode in FIG. 13 may be implemented in any number of programming languages and a variety of different hardware, and that the style and format should not be construed as limiting, but rather a general template of the steps and procedures that would be consistent with code used to implement some embodiments of this invention.

At line 1301, control circuitry 304 runs a subroutine to initialize variables and prepare to identify a portion of a media asset that corresponds to a content type selection criterion. For example, in some embodiments control circuitry 304 may copy instructions from a non-transitory storage medium (e.g., storage device 308) into RAM or into the cache for processing circuitry 306 during the initialization stage.

At line 1305, control circuitry 304 receives a content type selection criterion that identifies a type of content that a user desires in a condensed media asset. In some embodiments these instances may be retrieved from memory.

At line 1306, control circuitry 304 accesses a first database listing time ranges of a media asset, wherein each of the time ranges corresponds to the content type selection criterion. In some embodiments, this database may be stored locally (e.g., on storage device 308) prior to beginning process 1300. In some embodiments the database may also be accessed by using communications circuitry to transmit information across a communications network (e.g., communications network 414) to a database implemented on a remote storage device (e.g., media guidance data source 418).

At line 1307, control circuitry 304 retrieves instances of time ranges of the media asset that correspond to the content type selection criterion. In some embodiments, these instances may be stored in memory. For example, an instance of metadata that may have several values may be stored in memory in such a way that each value is organized in memory in a way that control circuitry 304 can readily identify.

At line 1308 control circuitry 304 iterates through the various instances of a time range of the media asset that corresponds to the content type selection criterion. If only a single instance is available, the loop will only execute once. This loop may be implemented in multiple fashions depending on the choice of hardware and software language used to implement the process of FIG. 13; for example, this may be implemented as part of a "for" or "while" loop, in some programming languages. In some embodiments, it may be convenient to store the instances of a time range of the media asset that corresponds to the content type selection criterion in a single class or encapsulated data structure that will perform the loop as part of an internal method.

At line 1309, control circuitry 304 queries a second database listing segments of the media asset and corresponding time ranges for segments whose corresponding time ranges match the retrieved time range that corresponds to the content type selection criterion. Depending on how the second database is implemented, an intermittent step may be required to convert the corresponding time range of each segment into a form consistent with the database. For example, each corresponding time range of each segment may be encoded into a value using an appropriate hashing algorithm prior to being transmitted to the database by control circuitry 304 as part of a query. In some embodiments, each corresponding time range of each segment may be encoded as a primitive data structure, and control circuitry 304 may submit the retrieved time range that corresponds to the content type selection criterion to the second database directly. After querying the second database, control circuitry 304 may receive a set of second database entries (segments) matching the time range that corresponds to the content type selection criterion. In some embodiments, control circuitry 304 may receive these entries (segments) in the form of a data-structure, a set of indices of the database, or a set of indices of another cross-referenced database.

At line 1310, control circuitry 304 will determine if there are second database entries (segments) match the retrieved time range that corresponds to the content type selection criterion. In some embodiments, control circuitry 304 may determine this by checking if the database returned an empty data structure or a NULL value in response to the query in line 1309. If there is at least one matching segment, the process will proceed to line 1311, and then cause the process to loop back to line 1308 where control circuitry 304 will retrieve the next instance of a time range of the media asset that corresponds to the content type selection criterion. But, if there is no matching segment, the process will proceed directly to line 1308.

At line 1311, control circuitry 304 executes a subroutine to add the segment to a portion of the media asset that corresponds to the content type selection criterion At line 1313, control circuitry 304 executes a termination subroutine after the process has performed its function and all instances of time ranges of the media asset that correspond to the content type selection criterion have been processed and checked against the second database. For example, in some embodiments control circuitry 304 may destruct variables, perform garbage collection, free memory or clear the cache of processing circuitry 306.

It will be evident to one skilled in the art that process 1300 described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be rewritten so control circuitry 304 is instructed to evaluate multiple instances of time ranges of the media asset that correspond to the content type selection criterion, and submit multiple database queries simultaneously using a plurality of processors or processor threads. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 14:
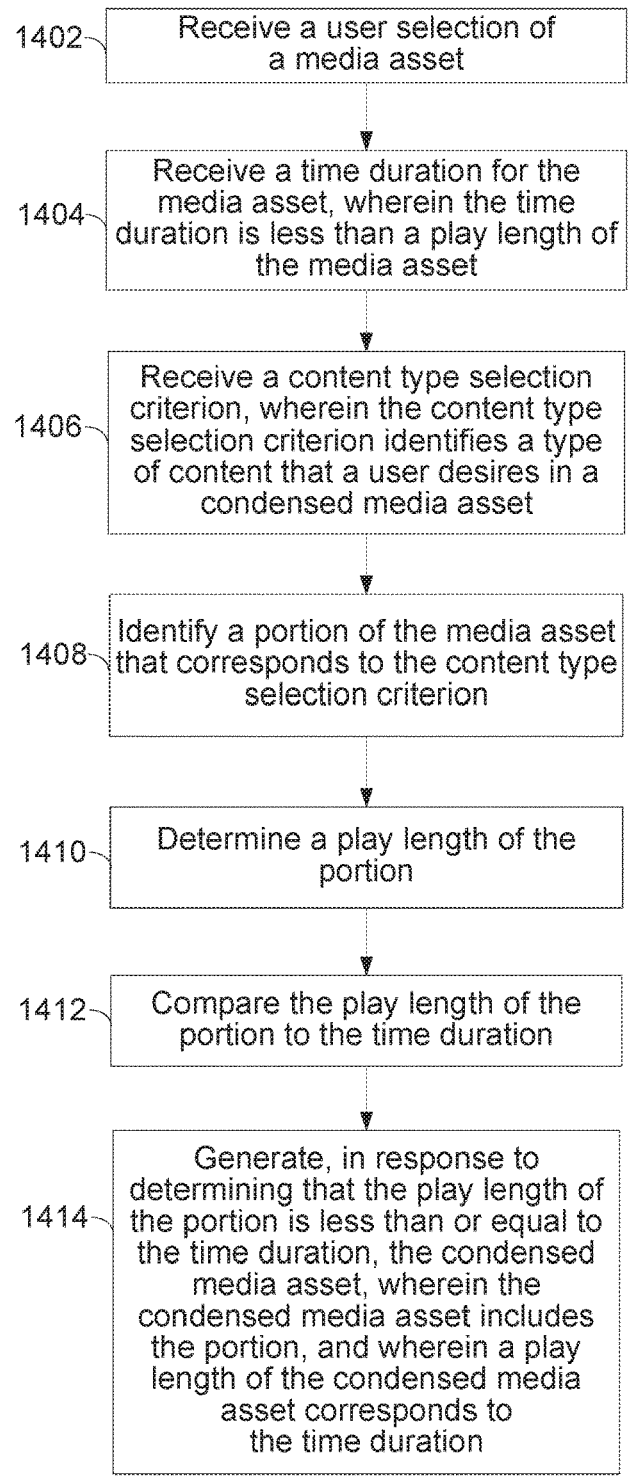
FIG. 14 is a flowchart of an illustrative process for generating a condensed media asset that includes a portion of a media asset that corresponds to a content type selection criterion in accordance with some embodiments of the disclosure.

FIG. 14 is a flowchart of an illustrative process for generating, in response to determining that the play length of the portion is less than or equal to the time duration, the condensed media asset, wherein the condensed media asset includes the portion, and wherein a play length of the condensed media asset corresponds to the time duration in accordance with some embodiments of the disclosure. It should be noted that process 1400 or any step thereof could be performed on, or provided by, any of the devices shown in FIGS. 3-4. For example, process 1400 may be executed by control circuitry 304 (FIG. 3) as instructed by a media guidance application implemented on user equipment 402, 404, and/or 406 (FIG. 4) in order to generate a condensed media asset. In addition, one or more steps of process 1400 may be incorporated into or combined with one or more steps of any other process or embodiment (e.g., FIGS. 10-13).

At step 1402, the media guidance application proceeds to receive (e.g., via control circuitry 304 (FIG. 3)) a user selection of a media asset. In some embodiments, control circuitry 304 may receive a single primitive data structure that represents the value of the user selection of a media asset. In some embodiments, the received user selection may be stored as part of a larger data structure, and control circuitry 304 may later retrieve the value by executing appropriate accessor methods to retrieve the value from the larger data structure. In some other embodiments, the media guidance application may receive a user selection of a media asset in the form of a string of text that represents the title of the media asset. The control circuitry 304 may convert this string into a format that it can later use to retrieve the content of the media asset from, for example, a database of media assets. Such a database may be located locally or remotely.

At step 1404, the media guidance application receives (e.g., via control circuitry 304 (FIG. 3)) a time duration to condense a media asset where the time duration is less than a play length of the full version of the media asset. In some embodiments, control circuitry 304 may receive a single primitive data structure that represents the value of the time duration. In some embodiments, the value may be stored as part of a larger data structure, and control circuitry 304 may retrieve the value by executing appropriate accessor methods to retrieve the value from the larger data structure. In some other embodiments, control circuitry 304 may convert the received time duration, which may be in an hour-minute format, into a format that control circuitry 304 may later use for subsequence operations.

At step 1406, the media guidance application (e.g., via control circuitry 304 (FIG. 3)) receives a content type selection criterion, wherein the content type selection criterion identifies a type of content that a user desires in a condensed media asset. In some embodiments, control circuitry 304 may receive a single primitive data structure that represents the value of the content type selection criterion. In some embodiments, the value may be stored as part of a larger data structure, and control circuitry 304 may retrieve the value by executing appropriate accessor methods to retrieve the value from the larger data structure. In some other embodiments, control circuitry 304 may convert the received content type selection criterion into a format that control circuitry 304 may later use for subsequence operations.

At step 1408, control circuitry 304 proceeds to identify a portion of the media asset that corresponds to the content type selection criterion. In some embodiments, control circuitry 304 may select one or more segments of the media asset that match a content type selection criterion. For example, control circuitry 304 may select one or more segments of the media asset that contain comedy content. In some other embodiments, the length of the portion may be shorter than the received time duration.

At step 1410, control circuitry 304 proceeds to determine a play length of the portion. In some embodiments, control circuitry 304 may call a counting function to sum up all of the lengths of the selected segments that match the content type selection criterion.

At step 1412, control circuitry 304 proceeds to compare the play length of the portion to the time duration. Control circuitry 304 may call a comparison function (e.g., for object-to-object comparison) to compare the value that represents the play length of the portion to the value that represents the time duration.

At step 1414, control circuitry 304 proceeds to generate, in response to determining that the play length of the portion is less than or equal to the time duration, the condensed media asset, wherein the condensed media asset includes the portion, and wherein a play length of the condensed media asset corresponds to the time duration. In some embodiments, once the segments of the portion that corresponds to the content type selection criterion are identified, control circuitry 304 may link and assemble them into a condensed version of the media asset.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 14.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the methods and systems described herein may be performed in real time. It should also be noted, the systems and/or methods described above may be applied to, or used in accordance with, other systems and/or methods.

What is claimed is:

1. A method for customizing media assets with feedback, comprising:
   receiving a user selection of a media asset, wherein the media asset has a plurality of plot points, each plot point indicative of a respective identifier of a respective segment of the media asset;
   receiving a time duration for consuming the media asset, wherein the time duration is less than a play length of the media asset;
   condensing the play length of the media asset to correspond to the time duration to generate a condensed media asset comprising a plurality of segments;
   determining, based on a plurality of values stored in a database, each of the plurality of values corresponding to a respective one of the plurality of segments, that a subset of plot points of the plurality of plot points is omitted from the condensed media asset;
   in response to determining that the subset of plot points from the plurality of plot points is omitted:
      determining a number of omitted plot points in the subset of plot points, wherein the omitted plot points are not present in the condensed media asset;
      determining, using control circuitry, a rating based on a numeric range that the number of the omitted plot points falls in, wherein the rating measures adequacy of the condensed media asset to convey meaning of the media asset; and
      generating for display an indication of the rating.

2. The method of claim 1, wherein each of the plurality of values stored in the database corresponds to metadata that indicates whether any plot point is present in a segment; and
   wherein the determining that the subset of plot points is omitted from the condensed media asset comprises identifying that the subset of plot points is not present in any of the plurality of segments based on the corresponding metadata associated with each of the plurality of segments.

3. The method of claim 1, wherein each of the plurality of segments is associated with a corresponding time range; and
   wherein the determining that the subset of plot points is omitted from the condensed media asset comprises:
      retrieving a beginning time and an ending time of each plot point of the subset of plot points; and
      comparing each of the retrieved beginning times and the retrieved ending times of the plot points of the subset of plot points to the corresponding time range associated with each of the plurality of segments.

4. The method of claim 1, wherein the determining that the subset of plot points is omitted from the condensed media asset comprises:
   retrieving entries of the database, wherein each entry of the database lists a segment of the plurality of segments and a corresponding value of the plurality of values, wherein the corresponding value indicates whether any plot point is present in the segment; and
   identifying whether the plot point is present in the segment listed in each entry of the database based on the corresponding value indicating whether any plot point is present in the segment.

5. The method of claim 1, further comprising:
   determining the number of omitted plot points, wherein the omitted plot points are not present in the condensed media asset;
   retrieving a maximum amount of plot points that are allowed to be omitted from the condensed media asset;
   determining whether the number of the omitted plot points is greater than the maximum amount; and
   alerting the user regarding a result of the determination.

6. The method of claim 5, where each of the plurality of segments is associated with corresponding metadata that indicates whether any plot point is present in a segment; and
   wherein the determining the number of the omitted plot points comprises:
      retrieving a total number of all plot points of the media asset;
      determining a count of included plot points based on the corresponding metadata of each of the segments, wherein the included plot points are present in the condensed media asset; and
      computing a difference between the total number of the all plot points and the count of the included plot points.

7. The method of claim 1, wherein the receiving the time duration for consuming the media asset includes receiving a user input moving an indicator along a time bar to set the time duration.

8. The method of claim 1, further comprising providing to the user the rating by generating for display a color to represent the rating, wherein the color changes when the rating changes.

9. The method of claim 1, further comprising providing to the user the rating by generating a sound to represent the rating, wherein the sound changes when the rating changes.

10. A system for customizing media assets with feedback, the system comprising:
   user input circuitry; and
   control circuitry configured to:
      receive, by way of the user input circuitry, a user selection of a media asset, wherein the media asset has a plurality of plot points, each plot point indicative of a respective identifier of a respective segment of the media asset;
      receive, by way of the user input circuitry, a time duration for consuming the media asset, wherein the time duration is less than a play length of the media asset;
      condense the play length of the media asset to correspond to the time duration to generate a condensed media asset comprising a plurality of segments;
      determine, based on a plurality of values stored in a database, each of the plurality of values corresponding to a respective one of the plurality of segments, that a subset of plot points of the plurality of plot points is omitted from the condensed media asset;
      in response to determining that the subset of plot points from the plurality of plot points is omitted:
         determine a number of omitted plot points in the subset of plot points, wherein the omitted plot points are not present in the condensed media asset;
         determine a rating based on a numeric range that the number of the omitted plot points falls in, wherein the rating measures adequacy of the condensed media asset to convey meaning of the media asset; and
         generate for display an indication of the rating.

11. The system of claim 10, wherein each of the plurality of values stored in the database corresponds to metadata that indicates whether any plot point is present in a segment; and
   wherein the control circuitry configured to determine that the subset of plot points is omitted from the condensed media asset is further configured to identify that the subset of plot points is not present in any of the plurality of segments based on the corresponding metadata associated with each of the plurality of segments.

12. The system of claim 10, wherein each of the plurality of segments is associated with a corresponding time range; and
   wherein the control circuitry configured to determine that the subset of plot points is omitted from the condensed media asset is further configured to:
      retrieve a beginning time and an ending time of each plot point of the subset of plot points; and
      compare each of the retrieved beginning times and the retrieved ending times of the plot points of the subset of plot points to the corresponding time range associated with each of the plurality of segments.

13. The system of claim 10, wherein the control circuitry configured to determine that the subset of plot points is omitted from the condensed media asset is further configured to:
   retrieve entries of the database, wherein each entry of the database lists a segment of the plurality of segments and a corresponding value of the plurality of values, wherein the corresponding value indicates whether any plot point is present in the segment; and
   identify whether the plot point is present in the segment listed in each entry of the database based on the corresponding value indicating whether any plot point is present in the segment.

14. The system of claim 10, wherein the control circuitry is further configured to:
   determine the number of omitted plot points, wherein the omitted plot points are not present in the condensed media asset;
   retrieve a maximum amount of plot points that are allowed to be omitted from the condensed media asset;
   determine whether the number of the omitted plot points is greater than the maximum amount; and
   alert the user regarding a result of the determination.

15. The system of claim 14, where each of the plurality of segments is associated with corresponding metadata that indicates whether any plot point is present in a segment; and
   wherein the control circuitry configured to determine the number of the omitted plot points is further configured to:
      retrieve a total number of all plot points of the media asset;
      determine a count of included plot points based on the corresponding metadata of each of the segments, wherein the included plot points are present in the condensed media asset; and
      compute a difference between the total number of the all plot points and the count of the included plot points.

16. The system of claim 10, wherein the control circuitry configured to receive, by way of the user input circuitry, the time duration for consuming the media asset is further configured to receive a user input moving an indicator along a time bar to set the time duration.

17. The system of claim 10, wherein the control circuitry is further configured to provide to the user the rating by generating for display a color to represent the rating, wherein the color changes when the rating changes.

18. The system of claim 10, wherein the control circuitry is further configured to provide to the user the rating by generating a sound to represent the rating, wherein the sound changes when the rating changes.

* * * * *